US009236093B2

(12) United States Patent
Tapper

(10) Patent No.: US 9,236,093 B2
(45) Date of Patent: *Jan. 12, 2016

(54) VIDEO BOOKMARK GENERATING DATA

(71) Applicant: CustomPlay LLC, Delray Beach, FL (US)

(72) Inventor: Alejandro P. Tapper, Wellington, FL (US)

(73) Assignee: CustomPlay LLC, Delray Beach, FL (US)

( * ) Notice: Subject to any disclaimer, the term of this patent is extended or adjusted under 35 U.S.C. 154(b) by 114 days.

This patent is subject to a terminal disclaimer.

(21) Appl. No.: 13/956,951

(22) Filed: Aug. 1, 2013

(65) Prior Publication Data

US 2015/0037005 A1 Feb. 5, 2015

(51) Int. Cl.
| | |
|---|---|
| *H04N 9/80* | (2006.01) |
| *G11B 27/32* | (2006.01) |
| *H04N 5/76* | (2006.01) |
| *H04N 9/804* | (2006.01) |
| *H04N 9/82* | (2006.01) |
| *G11B 27/11* | (2006.01) |

(52) U.S. Cl.
CPC ............. *G11B 27/329* (2013.01); *G11B 27/11* (2013.01); *H04N 5/76* (2013.01); *H04N 9/8042* (2013.01); *H04N 9/8205* (2013.01)

(58) Field of Classification Search
CPC .................................................... G11B 27/105
USPC ........................................................ 386/241
See application file for complete search history.

(56) References Cited

U.S. PATENT DOCUMENTS

| | | | |
|---|---|---|---|
| 5,434,678 | A | 7/1995 | Abecassis |
| 5,737,479 | A | 4/1998 | Fujinami |
| 5,778,135 | A | 7/1998 | Ottesen et al. |
| 6,192,340 | B1 | 2/2001 | Abecassis |
| 6,208,805 | B1 | 3/2001 | Abecassis |
| 6,317,795 | B1 | 11/2001 | Malkin et al. |
| 6,408,128 | B1 | 6/2002 | Abecassis |
| 6,504,990 | B1 | 1/2003 | Abecassis |
| 6,553,178 | B2 | 4/2003 | Abecassis |
| 6,889,383 | B1 | 5/2005 | Jarman |
| 7,975,021 | B2 | 7/2011 | Jarman et al. |
| 8,117,282 | B2 | 2/2012 | Jarman et al. |
| 8,150,165 | B2 | 4/2012 | Melikian |
| 8,374,387 | B2 | 2/2013 | Lienhart et al. |

(Continued)

*Primary Examiner* — Hung Dang
*Assistant Examiner* — Girumsew Wendmagegn
(74) *Attorney, Agent, or Firm* — Steven M. Greenberg, Esq.; Kara A. Brotman, Esq.; CRGO Law

(57) ABSTRACT

A video map comprising bookmark generating data that enables a user to avoid to manually navigate a menu and a trailer provided with a video; seek/step data identifying, for each of a plurality of video frames within the video, a navigation point and a number of video frames that are required to step to a video frame, the seek/step data enabling a navigator to seek to a navigation point appropriate to a begin video frame of a video segment, to step to the begin video frame of the video segment, and to begin playing at the begin video frame of the video segment; and segment information defining a begin video frame and an end video frame of each of a plurality of video segments within the video, the segment information enabling a playing of a presentation of the video less in length than the length of the video.

8 Claims, 10 Drawing Sheets

(56) References Cited

U.S. PATENT DOCUMENTS

| | | |
|---|---|---|
| 8,494,346 B2 | 7/2013 | Abecassis |
| 2003/0058946 A1 | 3/2003 | Mori et al. |
| 2005/0008328 A1 | 1/2005 | Kawa et al. |
| 2005/0166234 A1* | 7/2005 | Jarman ........................ 725/46 |
| 2013/0188932 A1 | 7/2013 | Hartley |
| 2015/0037002 A1* | 2/2015 | Fastige .................. G11B 27/28 386/241 |
| 2015/0037003 A1 | 2/2015 | Fastige |
| 2015/0037004 A1 | 2/2015 | Minder |
| 2015/0037006 A1 | 2/2015 | Tapper |

* cited by examiner

VIDEO BOOKMARK GENERATING DATA

BACKGROUND OF THE INVENTION

1. Field of the Invention

Systems for, and methods of, creating a downloadable video bookmark generating data.

2. Description of the Related Art

DVD-Videos released by the major motion picture studios conventionally store a full length motion picture encoded using the H.262/MPEG-2 Part 2 video technologies. DVDs generally provide scene selection and subtitles and/or closed captioning in a plurality of languages. Among other features, some DVDs include multiple camera angles for a scene, and the capability to play one of a plurality of different content versions (e.g. a director's cut or unrated version and an "R" rated versions). DVD capable devices, such as a DVD player, or a computer DVD drive with a software DVD player, require a DVD drive and a MPEG decoder. Such DVD devices provide for, among other features, fast-forward, fast-rewind, skip-forward or skip-backwards by chapters, turn on/off subtitles, subtitle and audio language selection, camera angle selection, and menu navigation to select, for example, multiple content versions.

While DVDs provide many capabilities and functions exceeding those provided by, for example, conventional linear playback formats, DVD devices do not fully realize the potential of random access video playback capabilities that are synergistically integrated with an externally provided map of a DVD video. Such a map of a DVD video may, for example, identify non-sequential video segments of the DVD video suitable for a 60 minute condensed presentation of the video. In such instances the definition of the beginning and ending video frames of the video segments must be responsive to artistic and seamlessness objective and not be constrained by technical deficiencies. At 29.97 video frames per second, a few video frames with its associated audio are often critical to the editor attempting to define the segments of a presentation from within a DVD video. An editor's artistic and seamlessness objectives require DVD devices capable of discreet begin video frame play and seamless play of non-sequential segment from within the digitally encoded video.

Microsoft Windows 7 provides codecs and libraries to enable play of DVDs with applications built with Microsoft Visual Studio 2008 and above. The Microsoft website recites that "DirectShow provides a component called the DVD Navigator source filter which simplifies DVD navigation tasks in C++. The DVD Navigator has all the capabilities that you find on a full-featured stand-alone DVD player, plus additional capabilities specific to playing DVDs on personal computers. Using the DVD Navigator, C++ and scripting developers can create full-featured DVD applications without referring to the DVD specification. The DVD Navigator, in coordination with the decoder filters, also handles regional management and copyright protection (CSS and analog copy protection), isolating application developers from these details." However, the DVD Navigator only allows seeking to only certain navigation points in an MPEG encoded video such as a major motion picture released on DVD. These navigation points may only provide access to video frames that are many frames away from an optimal begin play video frame. The DVD Navigator does not have a built-in function for playing from any desired video frame in an MPEG encoded video. This lack of discreet begin video frame play is a material limiting deficiency when attempting to play, from within a DVD video, a consecutive presentation of non-sequential segments that require discreet frame seamless playback.

U.S. Pat. No. 7,139,470, discloses creation of an I-frame index file to be performed after the MPEG data has been compressed, packetized, and multiplexed. Since the disclosure is limited to the identification of a limited number of predetermined I-frames, the teachings, among other shortcomings, do not provide for a discreet begin video frame play. The disclosure fails to anticipate the need for, or creating, as a separate file from an MPEG stream, seek and step data that facilitates access to I, P, and B frames in the MPEG stream, and for enabling the use of data, created for one release of a movie, on a second release of the same movie.

The playing of a DVD-Video conventionally requires a user to navigate menus and view trailers prior to being able to start playing the movie. Some DVD players and DVD software application enable a user to generate a bookmark, but only after manually navigating menus, and viewing or manually skipping/fast-forwarding past trailers. The DVD Navigator does not have a built-in function for directly accessing a movie title in a DVD-video without the user first manually navigating through the various menus and trailers. The prior art fails to address the cumbersome manner in which the bookmarks are generated.

BRIEF SUMMARY OF THE INVENTIONS

The present inventions relate generally to systems for, and methods of, utilizing a plurality of video playback navigators to provide for discreet begin video frame play and to seamlessly play non-sequential segments from within a digitally encoded video.

Accordingly, it is an object of the present inventions to provide with discreet begin video frame play from within a digitally encoded video.

It is also an object of the present inventions to provide with discreet begin video frame play and for seamless play of non-sequential segments from within a digitally encoded video.

It is also an object of the present inventions to provide, as a separate file from an MPEG stream, seek/step data for I, P, and B frames in the MPEG stream.

It is also an object of the present inventions to provide for the use of a map, created for one format of a video, for a second format of the video.

It is also an object of the present inventions to enhance the synchronization of seek/step data between one format of a video and a second format of the video.

It is an object of the present inventions to enable a user to avoid navigating menus and viewing trailers prior to being able to start playing the movie.

It is also an object of the present inventions to enable multiple simultaneous instances of a navigator to bypass navigating menus, and playing trailers prior to being able to start playing the movie.

Briefly, these and other objects are accomplished by a method of, prior to displaying video, utilizing the DVD Navigator to seek to a navigation point nearer the desired video frame of the beginning of the first segment of the presentation, stepping to that desired video frame, and pausing at the desired begin frame. During this process the video playback is hidden from display and the audio is muted. The process is then repeated for each non-sequential video segment up to the available or desired number of instances that the DVD Navigator can be simultaneously executed. Each of the DVD Navigator instances is cued according to the sequence of the respective segments. The pre-processing, in which none of the video segments are displayed, provides the time that is required to seek to a navigation point nearer the desired video frame of the beginning of a segment of the presentation, and stepping to that desired video frame. Once this initial pre-processing is completed, the playing of only the first video segment is executed by the appropriate DVD Navigator and is permitted to be displayed. Only when the playing of the first segment is completed, the second segment is played and displayed providing a seamless skip between the first segment and the non-sequential second segment. The first DVD Navigator instance is now available to pre-seek to a navigation point nearer the desired video frame of the beginning of a next unprocessed segment of the presentation.

The switching between DVD Navigators to provide seamless playback is enabled by the use of the computer's real-time clock. The number of DVD Navigators utilized is a function of a device's video software and hardware capabilities and the duration of the segments. Where each of the non-sequential segments is of sufficient duration only two DVD Navigator instances may be required to be utilized, thus, minimizing the time to pre-process the segment information. The seek and step function is facilitated by the use of a video map that identifies the begin and end frames of segments in a presentation, and seek/step data that identifies navigation points and the stepping required to arrive at any video frame. Advantageously, a video map created for one release of a movie is enabled for use on another release of the same movie. The utilization of multiple DVD Navigators is also facilitated by the creation of a bookmark that is used to directly access the desired video. The process is advantageously enhanced by enhancing the synchronization of a map between one format of a video and second format of the video, and by providing for a user to avoid to manually navigate menus, and skip/fast-forward past trailers prior to being able to start playing the movie.

These and other embodiments, features, advantages, and objects, are apparent in the context of the detailed description, accompanying drawings, and appended claims that follow.

BRIEF DESCRIPTION OF THE DRAWINGS

The following drawing figures, that form a part of this application, are illustrative of embodiments of the present invention and are not meant to limit the scope of the invention in any manner.

DETAILED DESCRIPTION OF THE INVENTIONS

Figure 1:
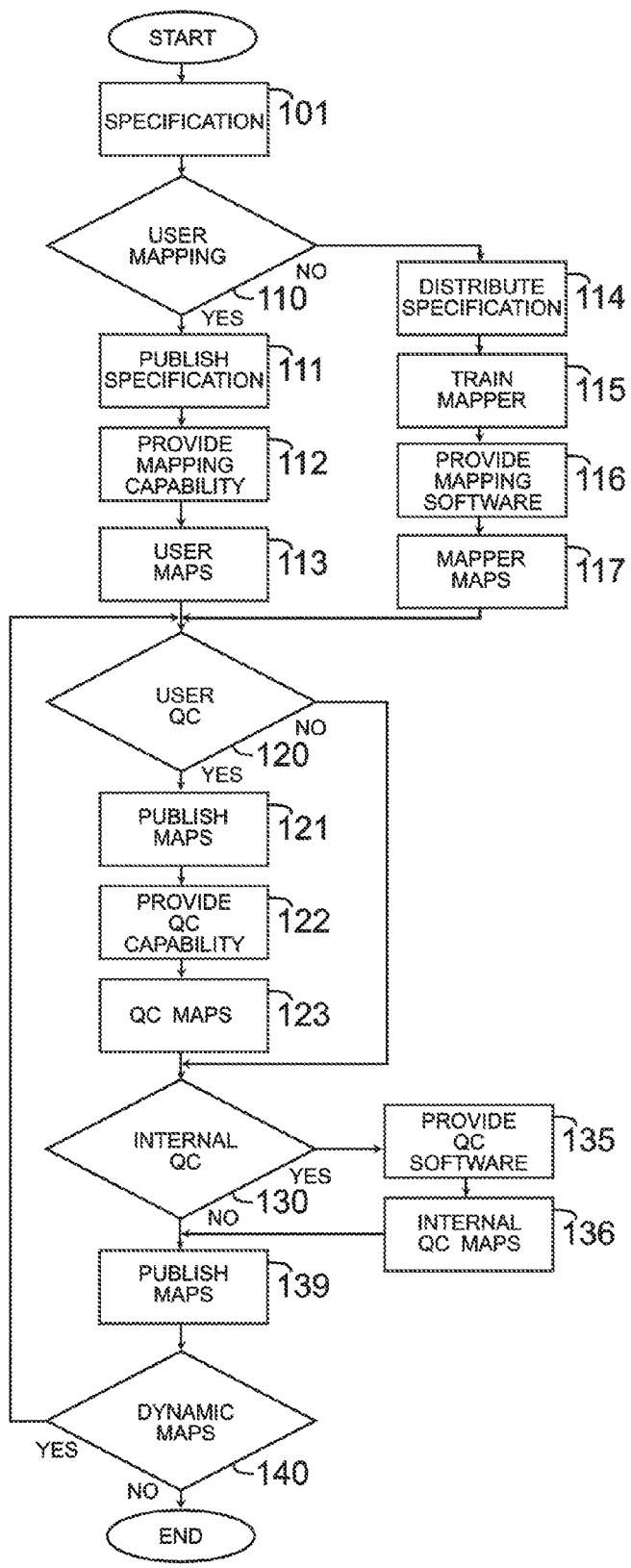
FIG. 1 is a flow chart of a method for creating a video map.

The descriptions herein will be readily understood by a person having ordinary skill in the art and that person would be expected to be knowledgeable of, for example and not limitation, the "DVD Specifications for Read-Only Disc/Part 3. Video Specifications" and related specifications available from Toshiba Corporation, H.262/MPEG-2 Part 2 video technologies, Microsoft's Windows Vista and Windows 7 operating systems, Microsoft's DirectShow, Microsoft's DVD Navigator Filter, and Microsoft Visual Studio 2008.

U.S. Pat. Nos. 5,434,678; 5,737,479; 5,778,135; 6,192,340; 6,208,805; 6,317,795; 6,408,128; 6,504,990; 6,553,178; 6,889,383; 7,975,021; 8,117,282; 8,494,346; and their respective divisions are incorporated herein by reference. Where subject matter described directly herein differs from subject matter described in an incorporated reference, the subject matter described directly herein should be considered in the context of the embodiments disclosed herein. The incorporated subject matter may be considered in the context of alternative embodiments. Further, the selective direct inclusion herein of portions of the incorporated references should not be interpreted as an indication of lack of materiality of the non-directly included portions.

For purposes of the present disclosure, various terms used in the art are defined as follows:

The terms "include", "comprise", and "contains" do not limit the elements to those listed. By contrast, only the term "consist" limits the elements to those listed.

The terms "application software", "software application", "application", "app", and "computer software" shall mean all the executable, libraries, scripts, instructions, and/or steps in any format that causes, or is required by, a device to perform a task, function, or process. Application software comprises a computer program designed to assist a user to perform task, function, process, or activity. In some instances application software and operating system software may be a synergistically integrated and indivisible.

The term "associate" shall mean assign, give, allocate, associate, designate, ascribe, attribute, link, and/or relate.

The term "clip" shall mean a segment that is smaller than a chapter and usually smaller than a scene. A clip includes one or more contiguous shots, and usually depicts the same primary characters within a location. A clip's definition is responsive to a material change in the participation of the principal characters, a material change in location, and/or a distinct change in thematic content or topic of conversation.

The term "content-on-demand system" shall mean a video-on-demand system that is responsive to a user's content preferences. A content-on-demand system not only permits a user to obtain a specific video(s) or segment(s) of videos in response to the user's programming preferences, a content-on-demand system also permits the user to receive a version of the video(s) or segment(s) of videos that are responsive to the user's other types of content preferences. A content-on-demand system and the delivery of variable content video services as described herein may utilize a variety of types of hardware and network infrastructure and are not limited to any particular hardware or network infrastructure that may be employed in a given implementation.

The term "DVD" shall mean a digitally encoded motion picture readable from an optical disc. A DVD comprises, for example, an optical disc storing a full length motion picture encoded using the H.262/MPEG-2 Part 2 video compression technology; an optical disc in compliance with the "DVD Specifications for Read-Only Disc/Part 3. Video Specifications" available from Toshiba Corporation; and a DVD-Video.

The term "MPEG" shall mean a digital compression/decompression technology. MPEG comprises, for example, a H.262/MPEG-2 Part 2 video compression/decompression technology.

The term "navigation point" shall mean a navigation pack, NV_PCK, VOBU, GOP, I-frame, and/or any address, location, or point, in a video, that a navigator is capable of seeking to.

The term "navigator" shall mean application software and/or operating system software that provide video playback capabilities, decoding, decrypting, and/or rendering, for playing a movie on a personal computer. A navigator comprises, for example, Microsoft's DVD Navigator, decoder filters, and renderer, to handle, for example, CSS and analog copy protection.

The term "network" shall mean any private or public, wired or wireless video communication system.

The terms "play" and "playing", as in play or playing a segment of a video, shall mean playing meaningfully, or substantially all or a portion of a segment. In other words, while a method or system disclosed herein may claim or intend to play the entirety of, or all, of a segment, a complete playing of a segment does not necessarily require the playing of every video frame, interlaced field, audio and sub picture portion, and/or bit of data of the segment.

The term "preferences" shall mean "programming preferences", "version preferences", "presentation preferences", "content preferences", "technical preferences", and "playback preferences". The term "programming preferences" shall mean preferences for a specific video (e.g. Spider-Man), genres of videos (e.g., Action), types of videos (e.g. interactive video detective games), series of videos (e.g., 007) broad subject matter of videos (e.g. mysteries), and/or time and date for playback of the video. The term "version preferences" shall mean preferences for a version of a video (e.g., motion picture), released by the copyright owner (e.g., motion picture studio), that includes content not available in an alternate version of the video. The version of a video refers to, for example, the "Theatrical", "Unrated", and "Director's Cut" version options in a DVD-Video. The version of a video does not refer to sequels and/or remakes of a video such as Spider-Man (2002), Spider-Man 2 (2204) and The Amazing Spider-Man (2012). The term "presentation preferences" shall mean preferences that cause the selective inclusion, in a presentation, of segments from within a video, a version of a video, or from within a plurality of videos. The Presentations, Compilations, Subjects, Dilemmas, Best Of, Performers, Shopping, Music, Search, and Preview features of the CustomPlay application provide for presentation preferences. The term "content preferences" shall mean preferences for the form of expression, explicitness, inclusion or exclusion of objectionable content, a level of explicitness in each of a plurality of content categories of possibly objectionable content, length, level of detail, type of thematic content, and/or depictions of potentially objectionable items and/or acts. The Control feature of the CustomPlay application provides for content preferences. The term "technical preferences" shall mean preferences for the technical and/or artistic preferences for, for example, the type of transitions (e.g., dissolves, fades, and wipes) that may be implemented during the playing of non-sequential segments. The term "playback preferences" shall mean preferences for the visual and audio options (e.g., camera angles, picture with picture, subtitles, closed captioning, and commentaries) provided in a video.

The terms "seamless" and "seamlessly" shall mean without gaps perceptible to the human eye, achieved by maintaining a constant video transmission rate. A seamless playing of non-sequential segment (i.e., the skipping of a segment) while "seamless", may not appear artistically seamless to a user (i.e., the substance of the content that is played, rather than how it is played, suggests that a skip of content took place).

The term "seek/step data" shall mean any index, data, and/or information that facilitates access to a video frame within a video and/or facilitates the utilization of a video map with a video. Seek/Step data need not include step data (e.g., data informing a frame advance). Seek/step data may, without the step data, directly address every video frame within a video. Further, for example, and not limitation, seek/step data need not be based on navigation points, synchronizing information (i.e., seek/step data) may be based on shot changes or scene changes in the video.

The terms "segment" and "video segment" shall mean one or more video frames.

The term "trailer" shall mean a trailer, preview, video clip, still image, and/or other content that precedes and/or is extraneous to the movie.

The term "user" is interchangeable with the terms "subscriber", "viewer", and "person", and shall mean an end-user person actively using video content, passively viewing a video, interactively playing a video game, retrieving video from a video provider, and/or actively subscribing to and using multimedia, internet, and/or communication services.

The term "variable content video" shall mean a video characterized by a nonlinear architecture facilitating a variety of possible logical sequences of segments. A variable content video comprises parallel, transitional, and/or overlapping segments to provide multiple versions of a video. Responsive to the particular embodiment implemented, a variable content video may also include a user interface, application software, software program routines, system control codes for controlling the playing of the video/audio, video map, bookmark generating data, seek/step data, and/or map synchronization data. A video that does require parallel, transitional, and/or overlapping segments to be variably played.

The terms "video", and "video program" are interchangeable and shall mean any video image regardless of the source, motion, or technology implemented. A video comprises images and audio found in full motion picture programs, films, movies, interactive electronic games, and video produced by multi-media systems. Video comprises still characters, graphics, images, motion pictures, films, and multimedia productions; full motion pictures and television programming; news, sports, cultural, entertainment, commercial, advertisements, instructional, and educational programming. Responsive to the particular embodiment implemented, a video may also comprise video, audio, sub picture information, and/or other information associated with the video, such as a user interface, application software, software program routines, system control codes for controlling the playing of the video/audio, video map, bookmark instructions, seek/step data, and/or map synchronization data. The term "movie" shall mean a video, and is generally utilized herein in those situations when the context references a video (e.g., a DVD-Video or Blu-ray Disc) that comprises other information (e.g., menus and trailers) and one or a plurality of videos (e.g., a rated version of a movie and an unrated version of the movie). Thus, for clarity, in those situations a video comprises a movie or a plurality of movies. A video such as a DVD-Video and a Blu-ray Disc generally store navigation data, menus, trailers, and, for example, a digitally compressed full length movie.

The terms "video map", "map", and "segment map", shall mean any combination, arrangement, table, database, or listing of information defining a beginning and ending of one or more segments. A video map may further comprise at least one descriptor associated with at least one segment or a sequence of segments, bookmark generating, and/or seek/step data. A defining of a beginning and ending of a segment may be by, for example, directly identifying a beginning and by indirectly identifying an ending by defining the duration of the segment. A descriptor is a word, term, code, phrase, or designation to describe or categorize.

The term "video-on-demand system" shall mean any video delivery system that is responsive to a user's programming preferences, i.e. provides a user-selected video at a user-selected time. Video-on-demand comprises, for example, movies-on-demand, video dial tone, cellular video, and digital satellite systems that are responsive to a user's time and date preferences and that provide play control functionality in the viewing of a video.

Where not explicitly and unambiguously inconsistent with the specific context, the above defined terms and other terms defined herein are to be understood in the broadest sense.

The teachings herein with respect to a video may be applied to, for example, any type or kind of content that may be captured in a video format, including motion pictures, movies, television programs, news programs, sports programs, educational videos, advertisements, informationals, commercials, and other videos that promote products and services. While a particular feature may be detailed with respect to a specified type of video, it is intended to apply the teachings herein broadly and harmoniously across all different types and classes of video, including, for example, and not by way of limitation, a variable content video and a variable content game.

Video Map

In a preferred embodiment, a video map is a SQLite database comprising a plurality of segment definitions each defining a video segment within a video. A video frame is any image or partial image in any digital or analog format comprising, for example, a frame of video, a video field, and an I, B, or P frame. A video frame may comprise or be associated with audio information. A segment definition defines (e.g., identifies) a begin frame and an end frame of a segment within a video. A video frame or position in a video may be identified by a variety of means including, for example, time codes in an HH:MM:SS:FF (Hours, Minutes, Seconds, and Frames) format, sequential frame integer format FFFFFF, bit positions, logical positions, physical location identifiers, or any format that can identify a location or position in a video.

A video map provides the information required by a feature or range of features that enable the customized playing and retrieval of content and information from within a video. The range of feature sets supported by a video map may comprise, for example, Presentations, Compilations, Subjects, Dilemmas, Best Of, Performers, Shopping, Music, Search, Preview, and Control, as well as many others. For example, the Presentations feature sets enable the user to select among a "60 Minutes" presentation, a "Custom" presentation that is responsive to the user's preferences for the level of explicitness in each of fourteen categories of possibly objectionable content (e.g. violence), a presentation that focuses on the action, a presentation from a character's perspective, and to play the movie as is. (The feature sets are detailed further below.)

In the case of a 60 Minutes presentation, the video map provides a plurality of segment definitions whose total playing time is between 55 and 60 minutes prior to any objectionable content customization. The segment definitions in a presentation's table are associated with an appropriate descriptor (e.g., 0, 1, 2, etc.) to differentiate those segment definitions from segment definitions that may correspond to a different presentation. The descriptors reference a separate table that associates a descriptor with a presentation name (e.g., 60 Minutes) for display in the UI.

The video map further comprises a reference to a visual depiction that is representative of a corresponding presentation. A visual depiction is any image or representation in image form, irrespective of the source, motion, quality, or relative size. A reference comprises, for example a direction, pointer, instructions, location to a source within the video, associated with the video, external to the video, remote to the video, or unrelated to the video. In a preferred embodiment, the reference to a visual depiction of a presentation comprises a timecode to a location within the video from which a depiction of a video frame suggesting the character of the presentation may be extracted. Alternatively, for example, the reference to a visual depiction comprises a link to an image available at a website or webpage.

The creation of the information in a video map supporting, for example, the 60 Minutes presentation may be guided by written guidelines and data formats ("specifications") that facilitate standardizing the methodology implemented in defining segments and assigning descriptors. Use of the specifications ensures a consistent quality experience for a user irrespective of the particular movie. In a preferred embodiment, the creation of segments definitions for a specific feature is executed by a trained editor ("mapper") guided by a feature specific specifications to create consistently elegant definitions of segments for that feature.

A video map, segment information, and/or descriptors may be provided by a variety of data formats. Means for storing segment data comprise, for example, a text or flat file, an xml document, and/or fields and tables in a database. There are many design choices that are available in drafting of the specifications' guidelines and data formats, and the corresponding application and data query routines. For example, the date for a sixty minute presentation need not be more than a text file or xml data providing a list of segment definitions. For example: 00:01:20:17, 00:02:41:14; 00:05:15:21, 00:05:37:08; 00:05:55:06, 00:06:12:03; . . . In a preferred embodiment, a video map comprises such tables, fields, indexes, and relational relationships to suit particular data and retrieval performance objectives.

In a preferred embodiment, the mapping of a video implements an assembly methodology where the creation of a map for each of the features is created by one or more of different group of specialist mappers and quality control personnel. Advantageously, the eleven feature sets are created by fourteen departments. The fourteen departments and their primary feature supported are: SIX and PRE (Presentations); COM (Compilation); SUB (Subjects); DIL (Dilemma); BES and CHA (Best Of and Performers); ADS (Shopping); MUS (Music); ITE, ITM, CLI, and SCE (Search); and OBJ (Preview and Control). In addition, video and other information is obtained by support and other specialized departments and included in a map.

Mapping of a video need not be the product of one or more mappers within an organization. The various maps of a movie may be created by a community supported methodology. Enhancing the richness of the mapping of segment while retaining a consistent and efficient coding may be accomplished by managing the contributions by a community supported methodology. The advantage of a community supported methodology is the potential to maximize the number movies for which, for example, a presentation is created. In a community supported methodology, a user with specific expertise in a motion picture may contribute a presentation. This contribution may be internally reviewed by a mapper or quality control supervisor, and/or be externally reviewed by the user community. Adherence to the requirements of the specification and data formats promotes the effectiveness of the architecture. The online encyclopedia "Wikipedia" provides an example of one of a number of community supported methodologies that serve as a production model. User contribution may be encouraged by the dynamics of an economic model. Additionally or alternatively, a user contribution may be encouraged and directly compensated by, for example, monetary payments, or indirectly compensated by, for example, the issuance of video content access minute credits in proportion to the value of the amount of the contribution.

FIG. 1 is a flow chart of method for creating a video map for one or more feature sets. In those embodiments, where a map creation process comprises the use of specifications, a video map production methodology comprises steps of drafting a specification 101 and publishing the specification externally 111, and/or distributing the specification internally 114. If a user collaborative methodology is implemented 110 alone or in combination with other methodologies, then it is advantageous to publicly publish the specifications 111. Alternatively, no specification is provided, and the user collaborative methodology is left to directly or indirectly develop its own specifications. Alternatively, in cooperation with such collaborative methodology, exemplary video maps may be published to serve as the specification to enable the community to proceed with video map production.

In a collaborative implementation, the user community may be provided with mapping capability, e.g., software, 112 that facilitates the drafting of maps by users 113. Alternatively, or in cooperative combination with such collaborative methodology, e.g., trained mappers 115 which have specialized mapping software 116, can create video maps 117. If neither the users 120 nor an internal staff performs quality control ("QC") 130, then the video maps produced by either the users 113 or the mappers 117 are published to end users 139 for use. If, as in other collaborative methodologies, users here also provide quality control 120, then work product of the users and/or the mappers, as appropriate is published 121 for purposes of quality control.

Users are provided with quality control capability 122 that enables them to provide quality control for video maps 123. Alternatively, or in cooperative combination with such collaborative methodology 130, mappers perform, with the aid of quality control training, software, and systems 135, an independent or dependent quality control of the video maps 136. Video maps that have undergone quality control at the external user level 123 or at the internal mapper level 136 are in due course published 139 for use by the end users. Published video maps 139 need not remain static, instead, advantageously, video maps after they are published, and while substantially completed, are viewed as work in progress 140. This would enable the end users and/or mappers to enhance video maps over time.

Notwithstanding the particular disclosure with respect to FIG. 1, a particular video map production embodiment need not produce all of the definitions and descriptors required to support all of the features detailed herein or incorporated herein by reference, and a video map need not be responsive to any specification and/or data format. As described above, a video map need only consist of information directly or indirectly identifying a beginning and ending of one or more segments, and one or more descriptors that may be necessary to support a single feature. Thus, in certain embodiments, the steps of drafting a specification 101 and publishing the specifications 111, among other steps, may be omitted. In those instances where individual feature maps are created, they may be merged into a map that combines all the various feature maps. Further, a particular set of steps of the video map production methodology may be used for one feature, e.g., the 60 Minutes presentation, and a different set of steps of the video map production methodology may be used for a different feature, e.g., Shopping.

Presentation Preferences

The CustomPlay media player application enables extracting a range of presentations from within a movie or a plurality of movies. The CustomPlay application exploits random access technologies to provide innovative presentations, special features, and playback capabilities. An embodiment of the CustomPlay application runs on a Windows PC and plays DVD-Videos released by the major motion picture studios. A full-featured map identifies an average of over 2,000 segments within a full length motion picture. Each segment is assigned the necessary descriptors to support one or more of the eleven feature sets (Presentations, Compilations, Subjects, Dilemmas, Best Of, Performers, Shopping, Music, Search, Preview, and Control) and various playback capabilities.

The Presentations feature provides storyline driven depictions that are focused on a genre, theme, perspective, or idea within a video. Presentations include Action, ActionX, Romance, Comedy, and Intellectual. A Sixty Minutes presentation retains the story flow, principal characters, themes, and the most memorable water-cooler moments. A Perspective presentation places a viewer within the emotional framework of a character. A storyline driven presentations is generally longer than 40 minutes.

The Compilations feature provides clips from a video that share similar content or theme without being driven by the plot or story. The Action compilation of the movie Dredd plays all the graphic action scenes without plot or story to interrupt the violence. The comedy compilation of Ted plays a highlight reel of the hilarious vulgar comedy. An Intellectual compilation of Contact plays the religious and philosophical debate so they it can be discussed without viewing the film. The Conversation compilation of Bad Santa plays the hilarious and touching conversations between Thurman Merman and Santa. A compilation presentation averages 10-30 minutes.

The Subjects feature provides sets of segments that are intended to amuse, inform, or parody. Subjects include Action (the nonstop gunfire in Predator), Character Mannerisms (blinky Bella in Twilight), Comedy (Ted's rants in Ted), Dirty Talk (dialog shifted from innocent to naughty), Film Technique (lens flares in Star Trek), Hidden Items (oranges in The Godfather), and Movie in A Nutshell (a nutty parody of the movie). A subject presentation averages 1-3 minutes.

The Dilemmas feature provides some of the most intellectually stimulating clips in a movie to provoke taught and conversations. Dilemmas depict conflicts between two competing moral principles such as compassion, financial responsibility, obligation to employees, parental responsibility, pursuit of soul mate, and self-actualization. A dilemma presentation averages 30-120 seconds.

The Best Of feature provides access to a video's best lines (each one segment of 5-10 seconds), best performances (each one segment of 1-2 minutes), memorable moments (each one segment of 1-2 minutes), memorable character presentations (each a set of segments totaling 30-45 seconds), and romantic moments (each one segment of 2-3 minutes). The Best Of feature also identifies the best depiction in each category in each video. The Best line in The Godfather: Don Corleone muttering "I'm going to make him an offer he can't refuse". The Best Performance in On the Waterfront: Marlon Brandon when he proclaims that he could have been a contender. The Most Memorable Character in Pirates of the Caribbean: The Curse of the Black Pearl: Captain Jack Sparrow's boorish mannerisms and swagger. The Most Romantic Moment in Casablanca: The moment when Rick responds "We'll always have Paris". The Most Memorable Moment in The Matrix: Neo appearing to bend time while narrowly dodging bullets on the rooftop of a downtown high-rise. The Performers feature supplements the Best Of feature and provides, for a principal performer, the retrieval of all the performer's clips (each clip 30-60 seconds, best lines, best performances, an intimate close-up presentation (each presentation 30-45 seconds), and memorable character presentation.

The Shopping feature provides links of an item or location depicted in video to a website that can provide additional information and/or the opportunity to purchase the item or obtain the service. The Shopping feature may be accessed during video playback, or through the Shopping catalog which provides 15-40 seconds presentations for a depicted product or service. Examples of featured Shopping items and services include: a life size statue of the T-800 statue from Terminator, the Algerian Love Knot necklace from Casino Royale, Arthur's leather jacket from Inception, and a James Bond bungee jump experience from Golden Eye. The Shopping feature links a musical item depicted in the video to a website that can provide additional information and/or purchase the musical item. Music may be accessed during movie playback, or through its own catalog of 30-90 sec. presentations.

The Search feature provides keyword searching for, for example, items, actions, performers, characters, film technique, production mistake, locations, and best lines" and retrieving segments, clips and scenes comprising the searched depiction. A Search segment is 5-10 seconds, a clip is 30-60 seconds, and a scene is 2-5 minutes. Examples of keyword searches include: "Trinity Ducati 996" in The Matrix; "Spider-Man kiss MJ" in Spider-Man; "filmmaking wipes" in Star Wars; "Brooklyn Decker CPx cleavage" in Battleship; and "bloody horse head" in The Godfather. The Search feature is the most capable in an embodiment that enables simultaneously searching a plurality of videos, e.g. the 007 movie series.

The Control feature enables the customization of a presentation according to a user's preferences for the level of explicitness (e.g., None, Mild, Explicit, and Graphic) in each of fourteen categories of possibly objectionable content (e.g., Bigotry, Blasphemy, Bodily Functions, Dishonor Flag, Dishonor Parent, Gore, Hideous, Mature, Nudity, Sex, Substance Abuse, Violence, Violence to Animals, and Vulgarity). The Control feature enables the exclusion of possibly objectionable content. By contrast, the Preview features provides a user the capability to selective retrieve the possibly objectionable content by a level of explicitness for each of the fourteen categories of possibly objectionable content. Preview provides an efficient access to content to, for example, enable an informed decision when adjusting the objectionable content preferences.

The CustomPlay application advantageously utilizes the data that supports the various features to enable innovative video playback capabilities including the "Who?" (U.S. Pat. No. 8,494,346), and "What?" (U.S. Pat. Nos. 6,408,128 and 7,430,360) functions, and the "In-Movie Shopping" feature. The Who? function, when enabled by the user during playback, utilizes performer and clip data to identify the performers and characters being depicted. The Who? Function also provides website links to additional information. The What? function, when enabled by the user during playback, rewinds the video a user defined amount of time and continues playback with the subtitles temporarily enabled. The In-Movie Shopping feature, if enabled, displays a small icon in the bottom left corner of the screen when there is more information available for the currently displayed item, prop, or music. Alternatively, or additionally, the In-Movie Shopping feature, if enabled, superimposes on the video an image and brief description of all the purchasable items depicted within the previous 30 seconds. The In-Movie Shopping feature provides access to web pages where additional information is available.

The CustomPlay application advantageously enables a "Play From" function that enables a user to continue playback from a current position in the video irrespective of the particular feature that is currently being used. For example, a user may utilize the Search feature to obtain a list of segments that are responsive to a keyword search. While playing one of the segments in the last, the user may activate the Play From function to play the video from that point in the segment.

Figure 2A:
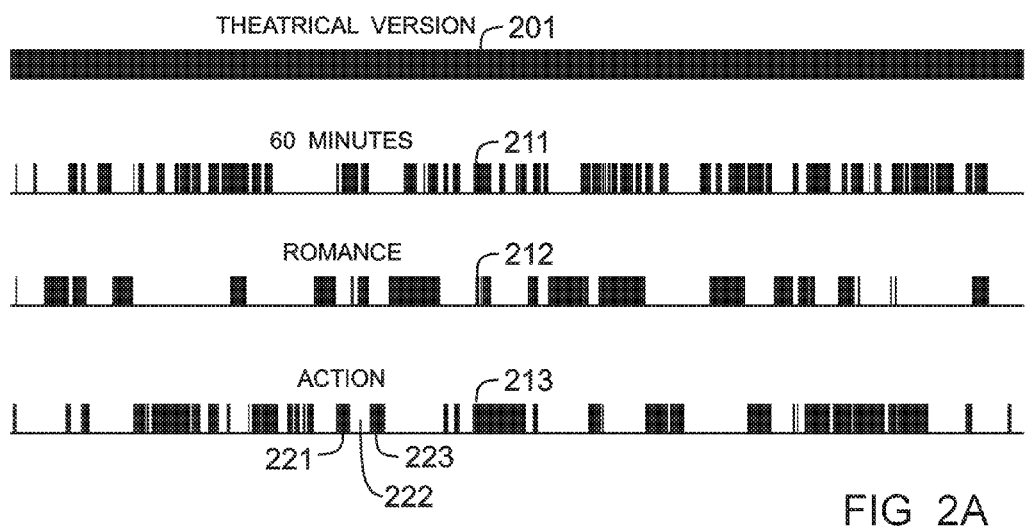
FIG. 2A illustrates examples of presentations of a movie.

FIG. 2A graphically illustrates a number of presentations of a movie defined by the video map for the motion picture Spider-Man. Depicted in black blocks 221 223 are the segments included in a presentation. The space in between black blocks 222 is content that is excluded (i.e., skipped) from the presentation. The various presentations are 60 Minutes 211, Romance 212, and Action 213. The user is also provided the option to play the Theatrical version 201 and a Custom presentation. The illustration depicts the substantial number of skips in the retrieval of non-sequential segments that are required to play a presentation. Two segments are deemed to be non-sequential segments when their playback requires a skip of a segment. In other words, two segments are deemed to be non-sequential segments when the linear playback of consecutive segments is discontinued by a skip of a segment. In the Action presentation 213 of FIG. 2A, segment 223 is intended to be played immediately after segment 221 is played, with the segment in between 222 being seamlessly skipped. Thus, segments 221 and 223 are an example of one type of non-sequential segments. As in the case of when a segment is "grafted" from another point in the movie, a playlist of non-sequential segments need not be played in the order of the begin frame timecode. In other words, another type of non-sequential segments is where a segment that is played has a begin frame timecode that precedes the end frame timecode of the prior played segment.

Figure 2B:
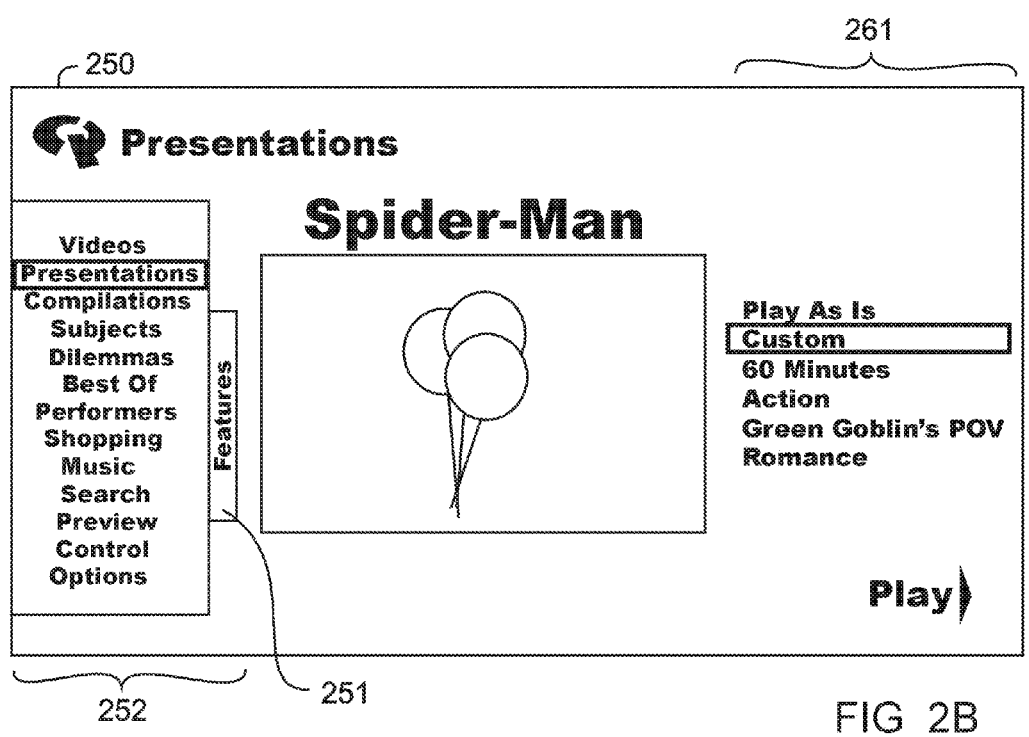
FIG. 2B graphically illustrates a feature selection screen that enables a user to select among the various presentations.

FIG. 2B graphically illustrates a feature selection screen for the Presentations set of features. The Presentations selection screen 250 is accessed by the Features tab 251 in the application's UI. The features tab 251 displays a features menu 252 listing, and providing access to, the primary functions, feature sets, and options of the application. The features menu 252 lists the application feature sets comprising Presentations, Compilations, Subjects, Dilemmas, Best Of, Performers, Shopping, Music, Search, Preview, and Control. The features menu 252 also provides access to video selection functions (Videos) and user options and settings (Options).

In the case of the motion picture Spider-Man, the Presentation set of features 261 include the options for a user to play: (i) the movie as is (Play As Is); (ii) a Custom presentation of the movie that is customized according to the user's content preferences; (iii) a 60 Minutes presentation comprising the principal plot and noteworthy elements; (iv) an Action presentation that focuses on the action elements and substantially excludes the romance and family plot elements; (v) a presentation from the perspective of the Green Goblin; and (vi) a Romance presentation that minimizes the action and focuses on the romance.

Upon a user selecting a presentation, the user's presentation preference is applied to the video map to generate a playlist of segments that is consistent with user's presentation preference. For example, if the user selects the Action presentation 213 FIG. 2A, the selection of segments for playback would be materially the opposite of those that would be selected for the Romance presentation 212 FIG. 2A.

Figure 2C:
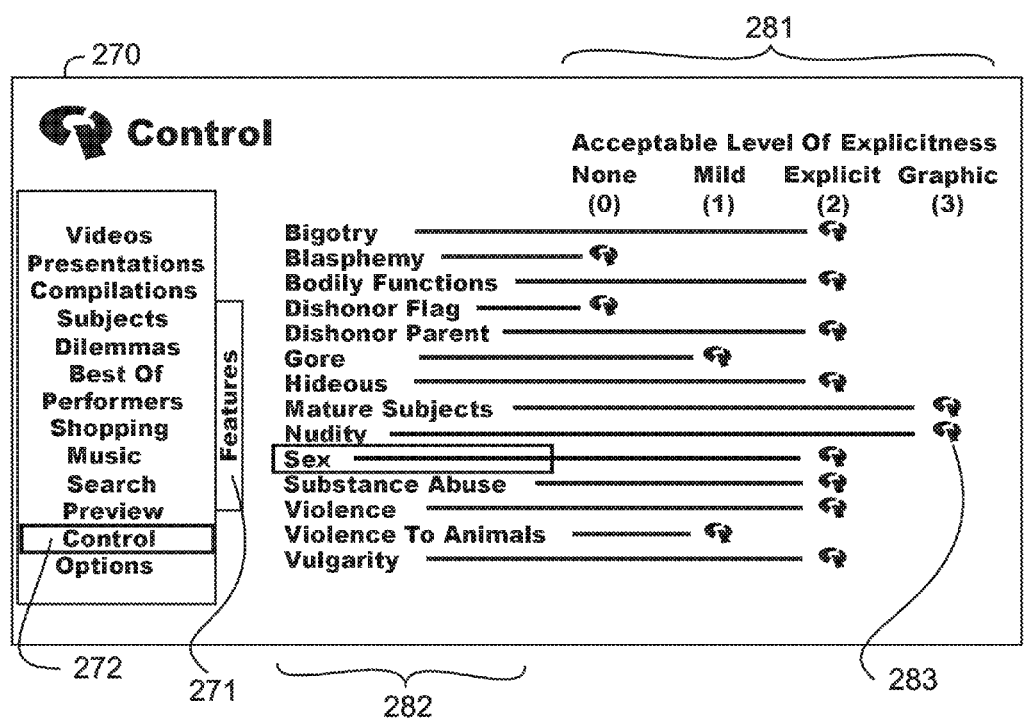
FIG. 2C graphically illustrates a content preference screen that enables a user to establish content preferences in each of a plurality of categories of possibly objectionable content.

FIG. 2C graphically illustrates a content preference screen that enables a user to establish content preferences. The Control selection screen 270 is accessed by the Features tab 271 in the application's UI. The Control feature 272 enables a user to establish content preferences for the level of explicitness (i.e., None, Mild, Explicit, or Graphic) 281 in each of fourteen categories of possible objectionable content (i.e., Bigotry, Blasphemy, Bodily Functions, Dishonor Flag, Dishonor Parent, Gore, Hideous, Mature Subjects, Nudity, Sex, Substance Abuse, Violence, Violence to Animals, and Vulgarity) 282. In this particular screen UI, users indicate their selections by using the player's remote control unit, and pressing the UP and Down keys to select a category, and by pressing the number 0 key for None, a number 1 key for Mild, a number key 2 for Explicit, and a number 3 key for Graphic. In the example illustrated in FIG. 2C, depicted with the CP logo 283 are the user specific content preferences for each category. The user in this case has elected to omit depictions of blasphemy during the playing of videos.

A viewer may pre-establish content preferences prior to playing any video, prior to playing a specific video, and modify the content preferences during a playing of the video with the new content preferences being applied to as the playing of the video resumes or continues. Advantageously, video specific content preferences will display only the options for which content is actually present in the video. For example, if the video does not contain any depictions of Gore, the Acceptable Level Of Explicitness will be set at None irrespective of any generalized pre-established content preference. Further, set of content preferences may be established for each of a plurality of users, be password protected, with supervisor limits set by category.

If the user selects, the 60 Minutes presentation and also request that the user's content preferences for the level of explicitness in each of fourteen categories be applied to that presentation, then the resulting "Custom 60 Minutes" presentation may be reduced to 45 minutes. The application of a user's content preferences to the video map results in the automated logical selection of sequential and non-sequential segments of the selected video that are consistent with the user's content preferences. Any segment, with a content coding higher (abstract) than the user-selected content preference for the corresponding category would not be included in the video produced for the user. The segment selected for viewing would satisfy the presentation preference and would have a coding level equal to or lower than the user specified content preference for that category Bookmark Generating Data The playing of a DVD-Video conventionally requires a user to navigate menus and view trailers to be able to start playing the movie. Some DVD players and DVD software applications enable a user to generate a bookmark, but only after manually navigating menus, and skipping/fast-forwarding past trailers. The bookmark enables a subsequent playing to seek directly to the play position identified by the bookmark. It is an object of the present inventions to enable a user to avoid navigating menus and viewing trailers prior to being able to start playing the movie. It is also an object of the present inventions to enable multiple simultaneous instances of a navigator to bypass navigating menus, and playing trailers prior to being able to start playing the movie.

In order to implement a multiple navigator embodiment, it is advantageous that a first navigator generate a bookmark to be made available to subsequent navigators. Since not all DVD-Videos may lend themselves to the creation of the required bookmark, the bookmark generation process may be conducted prior to determining if a map of the video should be created, and prior to the creation of the seek/step data. Importantly, to enable a user's player to automatically generate a bookmark requires indentifying the menu selections that are required to be navigated prior to being able to play the video. Bookmark generating data includes at least one menu selection (e.g., a UI button) required to be selected to advance towards playing the movie. Bookmark generating data may also include, where applicable, the identification of the movie (e.g., a DVD-Video's movie title). A player application utilizing, for example, a DVD Navigator, interprets the bookmark generating data to generate the instructions that cause the automatic navigation through the various menus, and, when not prohibited, skipping/fast-forwarding through trailers to efficiently reach the desired DVD-Videos title (i.e., the movie)

In one illustrative embodiment of the inventive methods and steps disclosed herein, a method of creating bookmark generating data comprises the steps of: (i) initializing playback of a video; (ii) retrieving navigation data, the navigation data relating to at least one menu and at least one trailer provided with the video; (iii) utilizing the navigation data to navigate towards a playing of the video; (iv) recording a trailer event that precedes a playing of the video; (v) recording a selection in a menu event, the selection being required to advance towards a playing of the video; (vi) creating, responsive to the recording of a selection in the menu and the recording of a trailer event, bookmark generating data; and (vii) making available for downloading, by a user, the bookmark generating data to enable the user to avoid to manually navigate a menu and a trailer event that precede a playing of the video. These steps and the disclosure herein suggest other possible embodiments resulting from the possible combinations, addition, deletion, and substitutions of the steps and/or elements.

Figure 3:
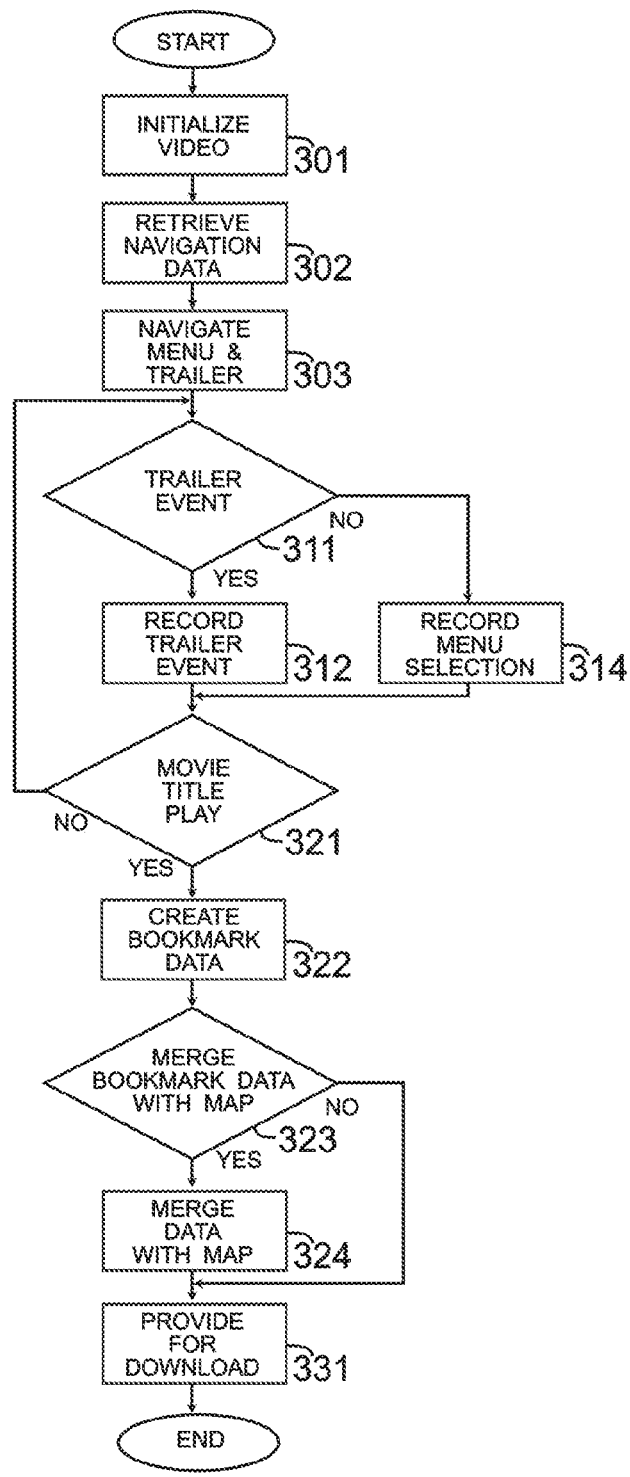
FIG. 3 is a flow chart of a method for creating the data needed for generating a bookmark.

FIG. 3 is a flow chart of a method for creating the data needed to generate a bookmark for a video. In a DVD-Video embodiment, an application utilizing a DVD Navigator or substantially capable navigator initializes the DVD-Video 301, and retrieves the navigation and presentation data 302 from the DVD-Video necessary to begin the navigation of the menus and trailers towards the playing of the movie title 303. The navigation data 302 relates to at least one menu and at least one trailer provided with the movie title. In order to create the necessary bookmark generating data, the bookmark generating application determines if a menu event or if a trailer event is encountered 311. If a menu event is encountered 311, the menu selection required to advance towards the playing of the movie is recorded 312. The menu selection (e.g., a UI button) required to be selected to advance towards the play of a movie and that is recorded 312 corresponds to the appropriate menu button selection identifier in the navigation data. If a trailer event is encountered (e.g., a trailer is played) 311, and the trailer event is required to be recorded 314, then the trailer event is recorded 315. Recording a trailer event 315 may, additionally or alternatively, record such other information as may be necessary for the player application to navigate the menus and trailers.

In a DVD-Video embodiment, the first event encountered is usually a trailer, and is followed by other trailer events prior to a first menu. A movie title menu presents a number of options including the option to play the movie. This is usually followed by a notice and the playing of the movie. The authoring of a DVD-Video is not limited to a single menu or a single menu set. Thus, in order to cause the playing of a movie title 321, the process of determining a trailer or a menu event 311, recording a menu selection 312, and optionally recording a trailer event 315, may be repeated as required until the movie title is played 321. Depending on the particular DVD-video or video authoring, a less or more detailed analysis and data recoding methodology may be implemented. For example, in a preferred embodiment, if a trailer event is encountered 311, the event is not recorded (i.e., the bookmark data does not include that information) 314. In such an embodiment, the player application, responsive to navigation data and play information available, generates the instructions necessary to attempt a skip/fast-forward of trailers.

If the playing of the movie title is activated 321, e.g., the movie begins to play, an identifier corresponding to the movie and the beginning of the movie may need to be recorded 322. The movie identifier may need to be recorded in those instances, where for example, the navigation data, does not distinguish between trailers and a movie, between versions of the movie, and/or a beginning of the movie is not otherwise identified. If the movie identifier information is required to be recorded 322, then the movie identifier is recorded 323. The movie identifier is any information that enables to distinguish the target movie from other content, such as other movies and/or trailers, provided with the video, and/or serves to locate the beginning of the movie. When the required data has been recorded, and other bookmark generating information is obtained, the bookmark generating data is created 331.

In those instances that a video map of a video is provided to a user, the bookmark generating data that has been created 331 may be merged in the video map of the movie 341. In that case, the bookmark generating data is merged with the video map of the video 342. In a video map database merge embodiment 342, the bookmark generating data 331 is placed in a video map table, with, for example, the following fields: ID, VideoID, PreMenu1, Menu1Button, Menu1TotButtons, PreMenu2, Menu2Button, Menu2TotButtons, PreMenu3, Menu3Button, Menu3TotButtons, PreMovie, MovieVTS, and ValidMovie. Alternatively, bookmark generating data is separately provided to the user's player application. The bookmark generating data and/or map is made available for downloading 351, by a user's device, to enable a user to avoid navigating menus and trailers. The bookmark generating data provides the data and information that is required by the player application to issue the instructions that generate a bookmark.

The process of recording the bookmark generating data may be done by: (i) manually recording the necessary information during a manual navigation of the video; (ii) semi-automatically by the use of software that, for example, records a button selection(s) during a manual navigation of the video, and automatically records a trailer event and a corresponding permitted skip or fast-forward action; and/or (iii) automatically by the use of software that would interpret a video's navigation and presentation data and extract the desired information. The latter while enhancing the creation of the bookmark generating data, may nonetheless still require some user intervention in, for example, the selection of an appropriate menu selection and/or movie title. Certain DVD-Videos may not provide the necessary navigation data to accurately identify the proper title and/or version of the movie. The bookmark generating data methodologies disclosed provide for the creation of a bookmark generating data for the most common and more complex DVD-Video presentation and navigation embodiments.

In one illustrative embodiment of the inventive methods and steps disclosed herein, a method comprises the steps of: (i) initializing playback of a video, the video comprising navigation data, at least one menu, at least one trailer, and a movie; (ii) obtaining an identifier of the video; (iii) downloading, responsive to the identifier and from a remote source, bookmark generating data that identifies a menu selection that is required to advance towards a playing of the movie; (iv) generating, responsive to the bookmark generating data, a bookmark for the movie to be utilized by a navigator, the generating enabling a user to avoid to manually navigate past a menu and a trailer provided with the video; and (v) playing, responsive to the bookmark, the movie. In one example of an alternate embodiment, the video comprises a plurality of movies, and the bookmark generating data further identifies one of the plurality of movies, thereby enabling a playing of the one of the plurality of movies without requiring the user to select among the plurality of movies.

Seek/Step Data

As a result of the I P B encoding technologies implemented, video frames in an MPEG-2 stream are coded and decoded in a different order than they are displayed. For example, an MPEG-2 GOP may be encoded, ordered in the coded stream, and decoded in the following order: I(1) P(4) B(2) B(3) P(7) B(5) B(6) P(10) B(8) B(9); and subsequently outputted from the decoder and played in the order: I(1) B(2) B(3) P(4) B(5) B(6) P(7) B(8) B(9) P(10). A B and P picture cannot be directly retrieved and properly decoded without decoding other pictures included in the stream. For example, if a begin frame in a segment is the B(3) picture, then the I(1) P(4) B(2) pictures would be required to be retrieved and decoded, even though the I(1) and B(2) would not be required to be displayed. Since a few video frames with its associated audio is often critical to a mapper attempting to define the segments of a presentation from within a video, the optimum definition of a begin and an end frame of a segment is often not an I-frame. Thus, in order to be responsive to the artistic objectives of the mapper, it is necessary to implement a system that enables unrestricted frame editing and subsequent precise video frame access during a playing of a video.

In order to facilitate unrestricted frame access with frame precision (begin playing at any frame within the video) it is advantageous to identify the navigation points, in a video, which a particular navigator is capable of seeking to, and to provide the number of frame steps required to reach each of the other frames within the video. This method provides advantages and addresses challenges not appreciated by the prior art. For example, as previously disclosed, the objectionable content control feature of the CustomPlay player enables customizing the presentation of a movie according to a user's preferences for the level of explicitness (i.e., None, Mild, Explicit, or Graphic) in each of fourteen categories of possible objectionable content (i.e., Bigotry, Blasphemy, Bodily Functions, Dishonor Flag, Dishonor Parent, Gore, Hideous, Mature, Nudity, Sex, Substance Abuse, Violence, Violence to Animals, and Vulgarity). When a user's possible content preference permutations are then applied to a presentation having its own segment definitions, the mathematically calculated potential desired video frames that would define the playlist easily exceeds the number of video frames in a movie. Rather than limit, the data to some predefined set of, for example, I-frames, it is simply more expedient and advantageous to create seek/step data that provides complete real-time seek and step that is not limited to a limited set of navigation points in a movie.

Figure 4:
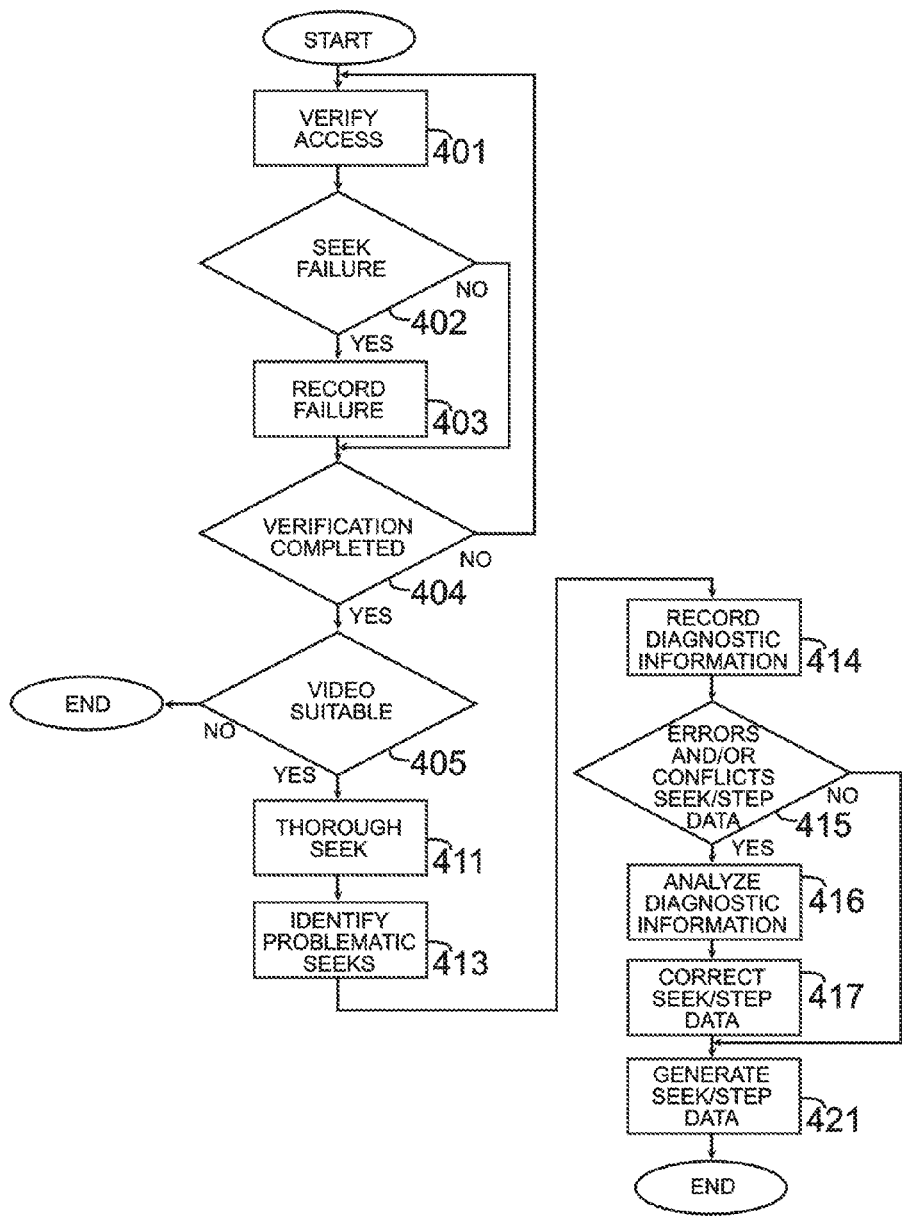
FIG. 4 is a flow chart of a method for creating seek/step data.

FIG. 4 is a flow chart of a method for creating seek/step data. Since not all video formats may provide, within the required performance limits and the capabilities of the specific navigator, for a direct seek to the desired navigation points, it may be desirable to first conduct a verification step 401. The verification step 401 is intended to verify that navigation points are accessible by the navigator within acceptable limits. Inaccessible areas that are not acceptable tend to have a gap between accessible navigation points greater than 5 seconds. A standard DVD-Video seek function is utilized to execute time seeks at intervals of two seconds through the entire duration of a video title. When an area is encountered that is not successfully seeked 402, a failure error is recorded by the application 403, and the verification process 401, if not completed 404, continues. If the verification process is completed 404, the failure record is checked to verify if the video is at this stage deemed suitable for its intended purpose 405. If determined not suitable the process is terminated.

Once the initial verification process is completed 404, and the video is deemed suitable 405, then a more thorough seek operation of the video is executed to identify the navigation points 411. The ultimate objective is to generate a set of instructions to enable a standard navigator, such as the DVD Navigator, to begin displaying content from any frame in the video. Advantageously, the seek operation is executed in reverse, meaning the video is navigated starting at the end and moves backwards through the navigation points towards the beginning of the video. This method is simpler and quicker than a forward seek method. In a DVD-Video embodiment the timecode of the navigation point is mathematically converted into an integer format at 30 frames per second. For example, the 00:01:05:20 (hh:mm:ss:ff) timecode is converted to 1970 frames. The navigation point identifier is collected in a file (e.g., simple text file, or database). The particular timecode format and data format (e.g., binary, text, database, html) and transport that are selected will be responsive to the particular application embodiment and the player resources available. An example of a portion and format of the navigation point seek data follows:
    180
    165
    150

Each of the numbers "180", "165", and "150" represent a navigation point. At the completion of the thorough seek process 411, the seek data only identifies accessible navigation points within the video. In a preferred embodiment, each navigation pack in a DVD-Video title will be represented by a corresponding navigation point identified in the seek data. On occasion, the seek generation process 411 excludes navigation points within the video stream that are not accessible 412 within certain limitations or time constraints, resulting in larger gaps between seek points and larger step frame counts. The amount of navigation points which may result in problematic or inaccurate seeks is variable to both the specific video title as well as the video title's frame position. Potentially problematic or inaccurate seeks are excluded from the seek data 412.

In order to provide access to any frame, the available seek data is interpreted by the application and converted into a file which contains a complete set of seek and step data for every frame of the video 421. An example of a portion and format of the seek and step data follows:
    150,9
    150,10
    150,11
    165,0
    165,1
    165,2
    165,3

In this example, the 130$^{th}$ row or line of data contains the "150,10" seek/step data. The row number identifies the frame number 130 (at an encoded rate of 24 frames per second). The numeral "150" represents the seek frame of a navigation point (at a playback rate of 30 frames per second). The numeral "10" represents the number of frames required to be stepped forward to reach the frame designated by the row "150,10". The numeral "10" is at an encoded rate of 24 frames per second. The seek/step data "150,10" provides the information to seek and step to frame 130.

The utilization of the data may be dependent on the application and navigator embodiment. For example, an embodiment utilizing the DVD Navigator requires that a minimum of 15 steps be executed. Thus, in order to seek and step to the frame designated by row "165,3", the seek is instead directed by the row "150,0' and 15 steps are executed in order to reach the frame designated by row "165,3". If a video frame designated by row "165,2" was the target, then a navigation point prior to the one designated "150,0" would provide the seek point as the total number of steps from "150,0" to "165,2" would only be 14.

In certain instances, the number of navigation points which may result in problematic or inaccurate seeks and that would be excluded would undermine the capability of a system to deliver a seamless presentation. The number of steps to reach a video frame from a seekable navigation point exceeds the amount of time allocated or available for the event. Thus, rather than exclude potentially problematic or inaccurate navigation points from the seek data, the seek data advantageously identifies such navigation points and provides diagnostic information to attempt to correct seek errors.

Accordingly, and advantageously, the seek generation process 411 identifies problematic seeks 413 and records error type data and other diagnostic information particular to that navigation point 414. The diagnostic information 414 may, for example, indicate conflict with a VOB cell transition area that interferes with seeking by a particular navigator. In other instances, a navigator may generate a false positive seek. If errors and/or conflicts in the seek data are present 415, the method for creating seek/step data advantageously comprises the additional steps of analyzing the synchronization diagnostic information 416 to verify the integrity of the generated seek data and/or correct at least some, if not all, of the errors/conflicts in the seek data 417. Adjusting seek/step data and correcting false positives 417 enables salvaging potentially necessary navigation point and frame access. The adjustments and/or corrections of the data 417 may be performed by a person or automated, and in a manner responsive to, for example, the particular navigator embodiment and type of issue. For example, in instances where a VOB transition area is present at, and/or conflicts, with access to a navigation point, the navigation point may instead be accessed by a seek to a prior navigation point and a step forward to the frame at the target navigation point. In this instance the adjusted seek/step data would instruct stepping a number of frames that would be greater than normal, but within the acceptable limits. In the example that follows, a VOB cell transition area exists at frame 225, that conflicts with seek at 225.

210,10
210,11
225,0
225,1
225,2

In that instance the, seek/step data would be corrected as follows:

210,10
210,11
210,12
210,13
210.14

As a particular embodiment, navigator, or video may require, each row of the seek/step data may be appended with additional compensating step data, and/or additional information and instructions. For example, additional data can be appended to each frame row in the seek/step file to provide the necessary compensating information to address pull-down and drop-frame considerations. In some DVD-Videos, areas of a video are encoded at mixed frame rates. In those instances additional pieces of data can be appended to each frame row in the seek/step data by representing additional frame steps needed to be executed in order to compensate for the increase in frames. Once the necessary adjustments and corrections are made the seek/step data is generated 421. It should be appreciated that the seek/step data in this embodiment is responsive to both the video format (e.g., DVD-Video), the authoring idiosyncrasies of a particular video in that format, and the capabilities and deficiencies of the navigator utilized (e.g., DVD Navigator).

In one illustrative embodiment a video map comprises: (i) segment information defining a begin video frame and an end video frame of each of a plurality of video segments within a video, the segment information enabling, responsive to a user's content preferences, of a playing of a presentation of the video less in length than the length of the video, the presentation seamlessly skipping a playing of a video segment within the video; (ii) seek/step data identifying, for each of a plurality of video frames within the video, a navigation point and a number of video frames that are required to step to a video frame, the seek/step data enabling a navigator to seek to a navigation point appropriate to a begin video frame of a video segment, to step to the begin video frame of the video segment, and to begin playing at the begin video frame of the video segment; and (iii) bookmark generating data that enable a user to avoid to manually navigate a menu and a trailer provided with the video.

Map Synchronization

As previously indicated, since a few video frames with its associated audio is often critical in defining video segments within a video, a map for a movie in one video format is usually required to be synchronized to a second video format of the movie. For example, a map created for a movie released in an MPEG-2 format (e.g., a DVD-Video) is likely to require some level of synchronization to that same movie released for downloading or streaming in, for example, an MPEG-4 format, and vice versa. The synchronization of a map for a movie may be carried out directly or indirectly through the synchronization of the seek/step data for the various formats of the movie. In some situations a simple adjustment reflecting the addition or deletion of beginning content in a movie between one format and the other is all that is required. This would be the case, for example, when the studio logo or introduction included in the movie is changed from one release to the other. However, in many instances, the various navigation points identified in the seek/step data require calibration.

Figure 5:
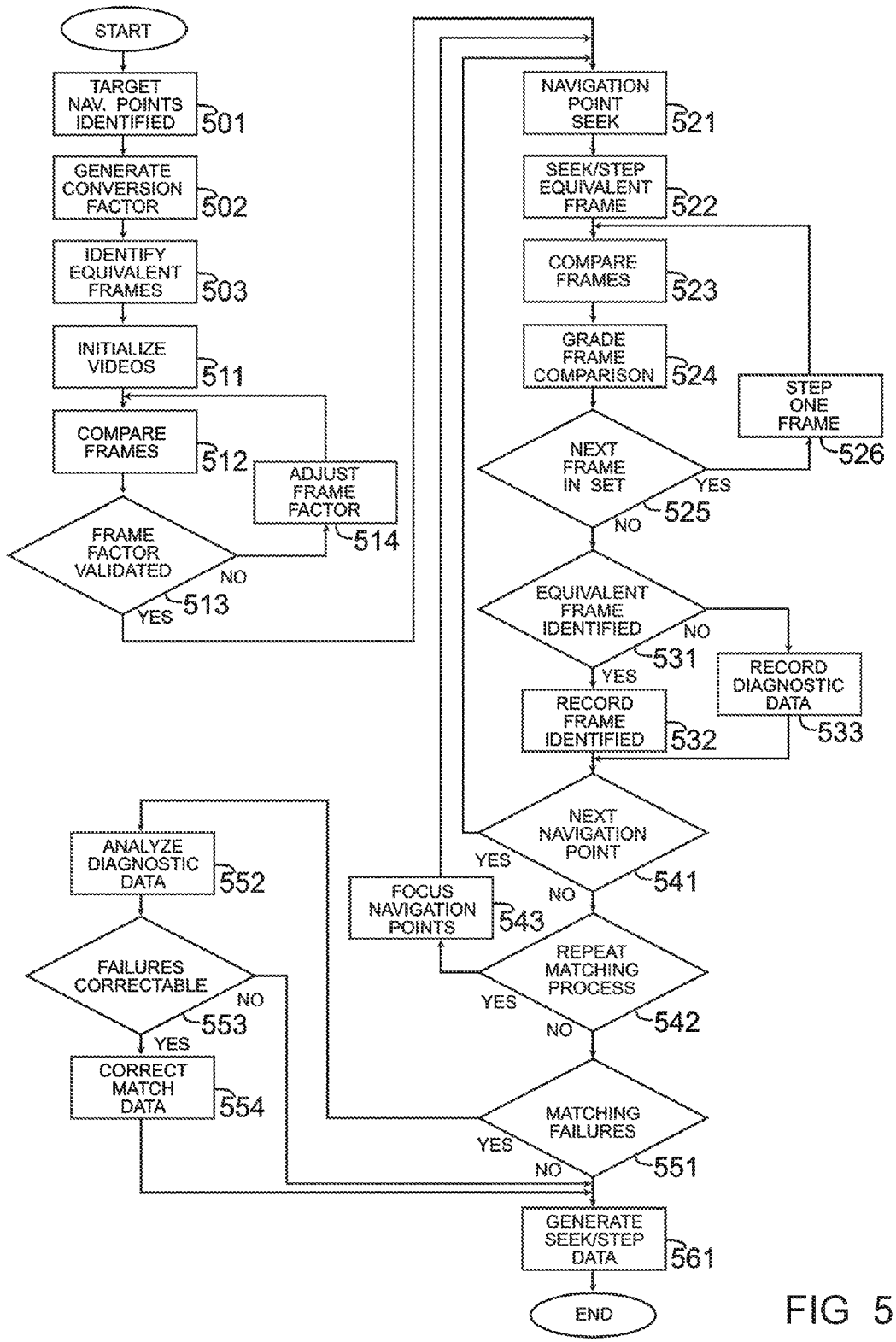
FIG. 5 is a flow chart of a method for synchronizing seek/step data to enable the functionality of a video map, created for a movie in one video format (e.g. streamed), to be synchronized for the movie in a second video format.

The flow chart of FIG. 5 details a method for synchronizing seek/step data to enable the functionality of a video map, created for a movie in a first video format (e.g. streamed), to be synchronized for the movie in a second video format (e.g., a DVD-Video release). Seek data for navigation points for the movie in a second video format (the target video program) are identified 501 in a manner similar to the generation of seek/step data detailed with respect to FIG. 4. The seek data for the target video program is reordered in ascending order. The frame rates for the target video program and the movie in the first video format (the source video program) are compared to create a conversion factor 502. The generated conversion factor 502 is first used to identify the approximate location in the respective formats of at least one set of equivalent frames 503. A video application responsive to each video format initializes the video for video frame analysis 511, preferably utilizing equivalent video resolutions. An initial image comparison step is performed for one set of frames to verify the accuracy of the conversion factor. This image comparison is executed by selecting a later navigation point in the target video program, for example, 80 minutes in the movie, and comparing it to the calculated video frame in the source video program 512. If a suitable match is established (i.e., the images represent equivalent frames) the conversion factor is validated 513. Otherwise, the conversion factor is adjusted 514, and the image comparison is again performed 512. Sometimes, depending on, for example, the encoding, frame-rates, pull-downs, drop frames, and/or telecine, a more complex or variable conversion factor or methodology may be required.

Once the conversion factor or methodology is deemed satisfactory 514, the process of identifying the equivalent video frames begins with seeking to the first navigation point in the target video program 521; seeking/steeping in the source video program to the calculated comparable frame less two frames 522; and comparing the video frame identified by the first navigation point in the target video program to the frame in the source video program 523. It should be appreciated that seeking and stepping in the source video program is also likely to require the use of a corresponding seek/step data for that format of the video. A video frame being compared is stored in memory as a bitmap for both the target video program and the source video program, and every pixel in the bitmap is compared between the bitmap of the target video frame and the bitmap of the source video frame. The pixel comparison process allows for a slight contrast difference which can occur between the two formats. Each comparison is graded on a scale of 1 to 10, with 1 being poor and 10 being perfect 524. The grading is responsive to mismatched pixels. To increase efficiency, the bitmaps are first compared at a lower resolution (1/40, 1/12, and 1/6 scale). Once the initial frame comparison is executed, the process is repeated for the next consecutive seven video frames in the source video program. If an additional frame in the set is to be compared 525, the video in the source video program is advanced one video frame 526, and the video frame identified by the navigation point in the target video program is compared to the video frame in the source video program 523. The extra video frame comparison enables compensating for, for example, telecine, interlacing, and/or duplicate video frames, to identify the most accurate match.

A number of different rules may be implemented to determine if a navigation point in the target video program is equivalent to a video frame in the source video program and to select among the close equivalent video frames in the set 531. For example, a seek navigation point in the target video program is deemed to be matched to a video frame in the source video program if either only one of the frames in the set is graded a seven or higher; or; if multiple frames are graded a seven of higher, only one frame in the set is graded a ten. If, for example, neither of these conditions is met, then the matching process failed to identify a suitable matched navigation point. In the event of a match 531, the data of the matching frame number is associated with the navigation point 532.

The existing art offers generalized image/visual recognition and image comparison methods and technologies, and determining rules that may be implemented in a preferred embodiment as per the teachings herein. By way of example, and not limitation, U.S. Pat. No. 8,150,165 discloses "A method for visual recognition of an object in an electronic image includes extracting unique points of an object to be learned and/or a target object." U.S. Pat. No. 8,374,387 discloses "A method and system for detection of video segments in compressed digital video streams is presented. The compressed digital video stream is examine to determine synchronization points, and the compressed video signal is analyzed following detection of the synchronization points to create video fingerprints that are subsequently compared against a library of stored fingerprints."

In those instances that a failed match is indicated 531, it is advantageous that the navigation point data include diagnostic information indicating the type of failure 533. Diagnostic information 533 includes the grading data, and any other data that may be advantageous to retain. For example, one of the following terms may be recorded to indicate the quality of a successful match: "Perfect", "Perfect-NearBy", "Good" and "Ok". These terms indicate that the navigation point is associated with a synchronization frame with different levels of confidence and accuracy. Most importantly, the diagnostic information 533 includes data relating to the nature of a failed match. For example, the synchronization comparison failed because the process either did not have enough time to seek to the point allotted by the process, failed because of significant visual differences, or was unable to reach the seek area, usually due to it conflicting with a cell transition area. One of the following terms is recorded to indicate the nature of a match failure: "Dup10s", "Dup7s", "BlackFrame", "Error", and "Bad-Seek". The label "Dup" indicates a video frame that is not sufficiently differentiated from a previous video frame. The appended digits indicate the lack of differentiation. The label "BlackFrame" indicates a video frame with very dark values that renders differentiation problematic. The label "Error" indicates a complete mismatch. The label "Bad-Seek" indicates that a seek was redirected to an incorrect location within the video.

The process of identifying an equivalent frame for each navigation point in the target video program, is repeated with each next navigation point 541, and begins with seeking to that navigation point 521. Once this initial cycle is completed, optionally, the matching process to this point may be repeated to enhance the accuracy of the results 542. The initial results may be affected by a variety of factors, including, for example, processing resources available.

In one illustrative embodiment of the inventive methods and steps disclosed herein, a method comprises the steps of: (i) comparing a video frame rate of one format of a video program (the source video program) to a video frame rate of another format of the video program (the target video program) to generate a conversion factor between the source video program and the target video program; (ii) retrieving a target video frame from within the target video program; (iii) storing in a memory, as a bitmap, the target video frame; (iv) retrieving, responsive to a location of the target video frame within the target video program, and responsive to the conversion factor, each of a plurality of source video frames from within the source video program; (v) storing in a memory, as a bitmap, each of the plurality of source video frames; (vi) determining equivalence between the target video frame and each of the plurality of source video frames; the determining being responsive to a comparison of bits of the bitmap of the target video frame and bits of the bitmap of a source video frame; and (vii) synchronizing, responsive to the determining, the target video frame and one of plurality of source video frames, the synchronizing enabling a set of non-sequential video segments of the target video program to be equivalent to a set of non-sequential video segments of the source video program.

In an alternate illustrative embodiment of the methods and steps disclosed herein, the method comprises the steps of: (i) comparing a video frame rate of one format of a video program (the source video program) to a video frame rate of another format of the video program (the target video program) to generate a conversion factor between the source video program and the target video program; (ii) retrieving a target video frame from within the target video program; (iii) retrieving, responsive to a location of the target video frame within the target video program, and responsive to the conversion factor, a source video frame from within the source video program; (iv) determining equivalence between the target video frame and the source video frame; the determining being responsive to an image comparison between the target video frame and the source video frame; and (v) synchronizing, responsive to the determining, the target video frame and the source video frame, the synchronizing enabling a set of non-sequential video segments of the target video program to be equivalent to a set of non-sequential video segments of the source video program. These two examples suggest other possible embodiments resulting from the possible combinations, addition, deletion, and substitutions of the steps and/or elements.

Advantageously, if the matching process is repeated 542, to increase efficiency, the navigation points to be processed may be reduced 543 to, for example, only those failures resulting from an Error" or "Bad-Seek". Once the process of identifying equivalent frames is completed 541, the matching process is repeated if necessary 542, and if any failures are indicated 551, the diagnostic data is analyzed 552 to determine if any of the failures should be corrected 553.

Attempting to fix Error and Bad-Seek situations should be carefully evaluated as a correction could lead to false positives. For example, for videos that produce inconsistent failure patterns (e.g., failure sequences are more erratic), the fixes must be used sparingly as there is potential for an inaccurate synchronization frame to be selected. Videos that produce reliable failure patterns lend themselves to higher confidence fixes. Attempting to fix failures that resulted from conflicts with a DVD-Video's Cell transition are also problematic. However, Dup and BlackFrame results indicate that a synchronization frame was found, but it landed in an area of duplicate frames or was too dark for a match to be made. Dup and BlackFrame types of failures lend themselves to being corrected 554.

The following is an example of a diagnostic data string for a matched navigation point: "161,131,True,Perfect,128,−3"

and an example of a diagnostic data string for a failed match navigation point: 401,−2,False,BlackFrame,320. The first number in the data string represents the navigation point. If the navigation point is matched, the second number in the data string, a positive number, represents the actual synchronization frame number. If the navigation point is not matched, the second number, a negative number will indicate the type of failure. In the data of the navigation points, successful matches will have a value of True, and failed matches will have a value of False. A successful match will indicate the level of accuracy e.g., Perfect. A failed match will describe the type of failure e.g., "Blackframe". The previous to last number in a matched string and the last number of a failed string is the calculated synchronization frame based on taking the navigation point and adjusting it by the conversion factor or methodology. The last number in the matched string is the distance between the visually synchronized frame for matched navigation point and the calculated frame, and is included for ease of analysis. The example of the coding and labeling above is exemplary, any diagnostic coding and/or labeling scheme and data format may be utilized.

The attempt to correct synchronization data 554 principally comprises an analysis of the data 552, and therefore, while the task may be executed by a person, software routines may be implemented to resolve most of the failures. Further, a person conducting the analysis of either the raw data or the software routines fixes may be aided in the analysis by applications that permit visual comparison and playback control/selection of individual frames in both sources. Clearly, as the frame factor generating methodologies and error correcting routines are enhanced, what is described herein as separate processes (e.g., frame comparison 523, the analysis of failure data 552 and correction of match data 554) may be advantageously combined to eliminate or greatly reduce the number of matching failures that may require analysis by a person.

An example of the analysis of the diagnostic data and correction of failed match follows with respect to Black-Frame failure. In such a situation, it is first determined the pattern of the distance between the visually synchronized frame for the matched navigation point and the calculated frame (i.e., the last number in the string). The following example exhibits a consistent pattern (i.e., −3):

146,119,True,Perfect,116,−3
161,131,True,Perfect,128,−3
176,143,True,Perfect,140,−3
191,155,True,Perfect,152,−3
206,167,True,Perfect,164,−3
221,179,True,Perfect,176,−3
236,191,True,Perfect,188,−3
251,203,True,Perfect,200,−3

This pattern indicates that the calculated frames are consistently 3 frames less than the synchronized frames. Thus, this adjustment may be utilized to correct Blackframe and Dup failures within the video.

By contrast, the following example exhibits an inconsistent or erratic pattern for matched frames:

135,110,True,Perfect,108,−2
150, 122,True,Perfect,120,−2
165,133,True,Perfect,132,−1
180,146,True,Perfect,144,−2
195,158,True,Perfect,156,−2
210,168,True,Perfect,168,0
225,181,True,Perfect,180,−1

This pattern indicates that the calculated frames are 0 to 2 frames less than the synchronized frames, and thus a video exhibiting this type of pattern renders error correction more difficult.

Returning to FIG. 5, fixing the synchronization data of a navigation point 554 involves associating the navigation point with an appropriate matching frame (changing the second number to a positive number), replacing the failed False designation with a value of True, and appending a number representing the adjustment of the calculated frame to the actual synchronized frame. The following is an example of the previously described failed navigation point data string: "401,−2,False,BlackFrame,320", and the now corrected data string: "401,323,True,BlackFrame,320,−3". The process of analyzing diagnostic data 552, determining if the failure is correctable 553, and, if appropriate, correcting the match data 554 is performed for every navigation point for which a matching frame was not identified 531.

Once the corrections that can be made are made, the data is utilized to generate the seek/step data 561 that synchronizes the map, created for a movie in one video format, to that movie in a different video format. In the illustrated example of the data string: "401,323,True,BlackFrame,320,−3", the first number in the string (i.e., 401) represents a navigation point in the seek/step data. The second number (i.e., 323) represents a row in the seek/step data.

In one embodiment, the synchronization is performed with the seek/step data while the map segment definitions remain constant. That is, a single map is synchronized to multiple formats of a video by means of their respective seek/step data. Alternatively, the definitions in a map are themselves synchronized to a particular format of a video or to a set of equivalent formats of the video.

The synchronization methods and steps disclosed herein are not limited to different video format of the same movie. The methods and steps are applicable to multiple versions of the same movie, and to permutations of multiple versions and different video formats. Such synchronizations require additional steps to account for, for example, parallel, transitional, and overlapping segments that define the distinctions between multiple versions of a movie. For example, the image comparison may be extended for a substantial number of consecutive frames to identify content gaps in one format versus the other. The frame where synchronization begins to fail and the frame where synchronization resumes, if they are separated by some material number of frames, defines a segment included in one format/version of the video and excluded in another format/version of the video. In those situations, the synchronization diagnostic information identifies a video segment included in the one format of a video program and excluded in the another format of the video program. Further, while multiple versions of a movie released on DVD-Video are rare and usually limited to two versions, none of the methods disclosed herein are limited in their applicability to only two versions, the number of video formats, and/or the video delivery platform, e.g., DVD-Video and download.

In one illustrative embodiment of the inventive methods and steps disclosed herein, a method comprises the steps of: (i) comparing a video frame rate of one format of a video program (the source video program) to a video frame rate of another format of the video program (the target video program) to generate a conversion factor between the source video program and the target video program; (ii) retrieving a target video frame from within the target video program; (iii) storing in a memory, as a bitmap, the target video frame; (iv) retrieving, responsive to a location of the target video frame within the target video program, and responsive to the conversion factor, each of a plurality of source video frames from within the source video program; (v) storing in a memory, as a bitmap, each of the plurality of source video frames; (vi)

determining equivalence between the target video frame and each of the plurality of source video frames; the determining being responsive to a comparison of bits of the bitmap of the target video frame and bits of the bitmap of a source video frame; (vii) generating, responsive to the determining of equivalence, synchronization diagnostic information; and (viii) synchronizing, responsive to an analysis of the synchronization diagnostic information, the target video frame and one of plurality of source video frames, the synchronizing enabling a set of non-sequential video segments of the target video program to be equivalent to a set of non-sequential video segments of the source video program.

In an alternate illustrative embodiment of the methods and steps disclosed herein, the method comprises the steps of: (i) comparing a video frame rate of one format of a video program (the source video program) to a video frame rate of another format of the video program (the target video program) to generate a conversion factor between the source video program and the target video program; (ii) retrieving a target video frame from within the target video program; (iii) retrieving, responsive to a location of the target video frame within the target video program, and responsive to the conversion factor, a source video frame from within the source video program; (iv) determining equivalence between the target video frame and the source video frame, the determining being responsive to an image comparison between the target video frame and the source video frame; (v) generating, responsive to the determining of equivalence, synchronization diagnostic information; and (vi) synchronizing, responsive to an analysis of the synchronization diagnostic information, the target video frame and the source video frame. These two examples suggest other possible embodiments resulting from the possible combinations, addition, deletion, and substitutions of the steps and/or elements.

Multi-Navigators

Figure 6:
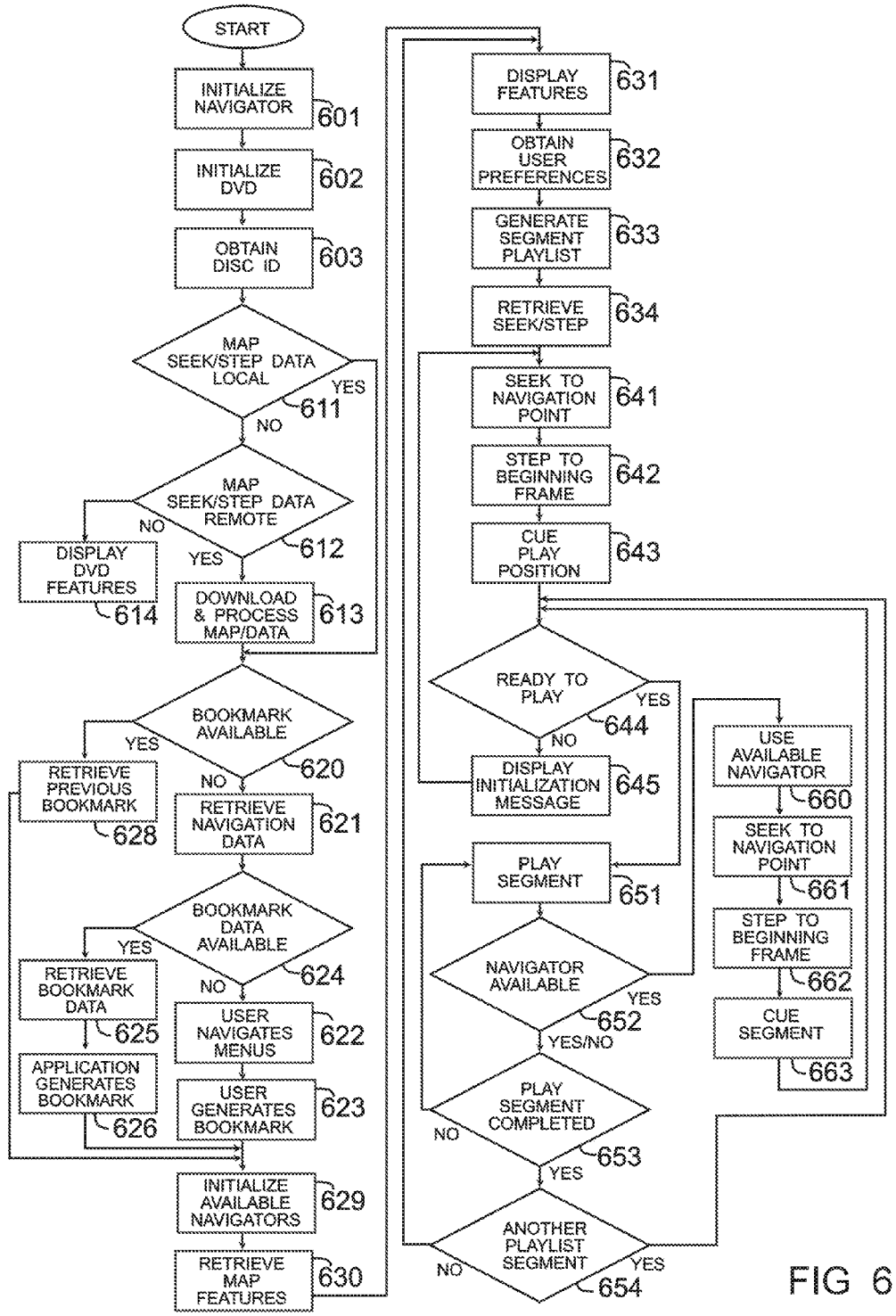
FIG. 6 is a flow chart of a method for utilizing a plurality of video playback navigators to provide for discreet begin video frame play and to seamlessly play non-sequential segment from within a digitally encoded video.

FIG. 6 is a flow chart of a method utilizing a plurality of video playback navigators to provide for discreet begin video frame play and to seamlessly play non-sequential segments from within a digitally encoded video. Upon running the application software, a navigator is initialized 601 and, if present, a DVD, is initialized 602. The object of initializing the navigator is to retrieve an identifier 603 of the movie. In the case of a DVD-Video, this identifier 603 would be a Disc ID. The Disc ID is a generated identifier that is unique to a DVD-Video. The identifier 603 is utilized to search the player's set of locally available maps or map database 611. If the map is not found to be locally available 611, the map may be available at a location remote to the player 612, and downloaded from the remote location 613. The downloading of a map may require additional pre-processing such as merging with the local map database 613. In the event that a map of the movie is neither locally available 611, nor remotely available 612, then conventional video playback features are made available 614. In the case of a DVD-Video, conventional features would include access to the movie's associated menus and features, and the DVD-Video would be played in a conventional manner.

In order to facilitate access to the movie by multiple navigators, a bookmark is generated to enable a subsequently initialized navigator to automatically skip to the beginning of the movie. If a previously generated bookmark is available 620, then the bookmark is retrieved 628. If a previously generated bookmark is not available 620, then the video's navigation data is retrieved 621. If, advantageously, bookmark generating data is available 624, then the bookmark generating data is retrieved 625, and the application generates a bookmark 626 instead of the user having to navigate the menus and trailers that precede the movie. In a preferred embodiment, the bookmark generating data is retrieved 625 from the local map database. Alternatively, the bookmark generating data may be retrieved (e.g., downloaded) from a remote location.

If a previously generated bookmark is not available 620, and if bookmark generating data is not available 624, then the retrieved navigation data 621 is utilized to enable the user to navigate 622 the menus and trailers that precede the movie. When the desired title is selected a bookmark is generated 623 by the user and/or the application.

In the situation where bookmark generating data is available 624, and the bookmark generating data is retrieved 625, the application automatically navigates through the various menus, and attempts to skip/fast-forward past trailers to efficiently reach the desired movie (e.g., DVD-Video movie title). In a DVD-Video embodiment, the process automatically mimics a user manual first play of the DVD-Video, but advantageously provides a more efficient and faster skip/fast-forwarding of trailers when possible, and error-free responsiveness to the menus implemented by the particular DVD-Video. The bookmark generating routines, responsive to the bookmark generating data, attempts to skip past trailers. If a skip is prohibited by, for example, the DVD-Video's user operation control, a fast-forward is attempted. If this is prohibited, a play of the trailer take place, but is not displayed. When the automated process generates the playing of the movie, a bookmark for the start of the movie is generated by a navigator's bookmark generating feature or by an application sub-routine. The bookmark provides the information that is required to duplicate the state of the video playback at the time the bookmark was created.

Once the bookmark is obtained, the available and/or desired navigators are initialized 629. The Nvidia Geforce GTX 650 with the Nvidia Driver version 310.90 for Windows 7 64-bit has been found to generally provide for running eight simultaneous instances of the Microsoft DVD Navigator. The map of the movie is queried to retrieve feature and other information available for the movie 630 to display in the player's UI the available features for the movie 631. A navigator may be used to retrieve images from within the video to display in the UI. The user's preferences that are obtained 632 identify the user's presentation preference for a feature enabled by the map. The user's preferences 632, causes the generation of a playlist of the appropriate segments of the movie 633. The playlist 633 would be responsive to segments depicting content consistent with the user presentation preference, and be responsive to the user's content preferences. As the playlist is generated 633, the seek/step data is retrieved 634. If there is no request by the user in response to the display of features 631, then the application will behave in a conventional manner, e.g., sleep, or, after some extended period of time, close.

A first navigator is utilized to seek to a navigation point 641 corresponding to the beginning of a first segment in the playlist, to step to the begin frame of the segment 642, and pause and cue the playing from that play position 643. While the navigator "plays" the video from the navigation point, and is caused to step through frames at an accelerated rate to and including the begin frame of the segment, the video is hidden (i.e., not displayed) and the audio is muted so as to not be perceived by the user. This non-displayed "play" is referred to as seek, step, and cue. A number of parameters may be evaluated to determine if playing of the segment proceeds at this point 644 or if an additional navigator should be caused to seek 641, step 642, and cue 643 a next segment in the playlist. For example, if the first segment is of sufficient duration, the playlist would be deemed ready to be played 644, the segment would be played 651, and there would be no need to extend the display of the initialization message 645.

While the segment is played 651, if a navigator is available 652, then that navigator 660 may be utilized to seek to the navigation point 661 of a next not cued segment in the playlist, step to the begin frame 662, and pause and cue the playing from that play position 663 (i.e., the begin frame of the segment). A navigator becomes available when it has completed playback of a segment. During a playing of a segment 651 multiple navigators may be caused to seek 661, step 662, and cue 663. Optimally, multiple navigators are cued ready to play non-sequential segments. However, a navigator's background seek 661, step 662, and cue 663 activity is preempted, slowed, or paused so as to not interfere with the proper playing of a current segment 651 or the synchronization of the playing from one segment to the playing of another segment. A navigator's background seek 661, step 662, and cue 663 activity may be slowed to, for example, 24 frames per second during another navigator's playing of a segment. Further, a navigator's background seek 661, step 662, and cue 663 activity may be preempted or paused during another navigator's nearing playing the end of a segment. The playing of a segment 651 is not intended to be interrupted by the background process of determining if a navigator is available 652 and utilizing the available navigator 660. Thus whether a navigator is available or not (YES/NO) 652, the playing of a segment 651 is continued until completed 653.

The duration of the playing of a segment is calculated by using the difference in the begin frames and end frames that define a segment. When a playing of a segment is completed 653, if there is another segment to be played 654, and the segment is ready to be played 644 (i.e., a navigator has completed an initial seek 641, step 642, and cue 643, or a subsequent seek 661, step 662, and cue 663 of a yet to be played segment) then the appropriate navigator is caused to begin playing a segment 651 responsive to the playlist and the seek/step data. The switching from the playing of a segment by one navigator to the playing of a next segment in the playlist by a different navigator is time synchronized as to appear at least technically seamless to a user. The devices real-time clock provides the required timing to switch between navigators for a seamless transition between non-sequential segments. Sometimes the playing of non-sequential segment (i.e., the skipping of content) while technically seamless, may not appear artistically seamless to a user. Such outcomes are sometimes the necessary tradeoff in skipping the playing of objectionable content. A number of editing techniques, such as dissolves, fades, and wipes, may be conventionally implemented during the transition from the playing of one segment to the playing of a next segment. Cross fading of audio is particularly useful in enhancing the visual perception of seamlessness.

There are instances that, because of a sequence of segments that are each very short in duration, there is no sufficient time to permit a navigator 660 to execute a seek 661, step 662, and cue 663 prior to the completion of the playing of a last cued segment. That is, there would not be a next segment ready to be played seamlessly 644. At that moment, an initialization message is displayed 645, while a seek 641, step 642, and cue 643 process is restarted.

The flow charts herein detailed are intentionally drafted to disclose a number of possible embodiments. A number of permutations, combinations, deletions, and reordering in the specific steps are possible and will be apparent to those skilled in the art. Further, recursive functions may be performed and/or initiated at different points in the process than those illustrated or detailed. Further, as the disclosure suggests, additional elements (e.g., editing techniques) may be synergistically implemented in one of many possible embodiments.

In one illustrative embodiment of the inventive methods and steps disclosed herein, a method comprises the steps of: (i) retrieving segment information defining a begin video frame and an end video frame of each of a plurality of video segments within the video, the segment information enabling, responsive to a user's content preferences, of a playing of a presentation of the video less in length than the length of the video, the presentation seamlessly skipping a playing of a video segment within the video; (ii) retrieving seek/step data identifying, for each of a plurality of video frames within the video, a navigation point and a number of video frames that are required to step to a video frame; (iii) utilizing the seek/step data and a first navigator to seek to a navigation point appropriate to a begin video frame of a first video segment, to step to the begin video frame of the one video segment, and to cue a playing at the begin video frame of the first video segment; (iv) utilizing the seek/step data and a second navigator to seek to a navigation point appropriate to a begin video frame of a non-sequential video segment, step to the begin video frame of the non-sequential video segment, and cue a playing at the begin video frame of the non-sequential video segment; (v) utilizing the first navigator to enable a playing of the first video segment; and (vi) synchronizing the second navigator to enable a playing of the non-sequential video segment seamlessly following the playing of the first video segment.

In an alternate illustrative embodiment of the methods and steps disclosed herein, the method comprises the steps of: (i) retrieving segment information defining a begin video frame and an end video frame of each of a plurality of video segments within the video; (ii) utilizing a first navigator to seek to a navigation point appropriate to a begin video frame of a first video segment, to step to the begin video frame of the one video segment, and to cue a playing at the begin video frame of the one video segment; (iii) utilizing a second navigator to seek to a navigation point appropriate to a begin video frame of a non-sequential video segment, step to the begin video frame of the non-sequential video segment, and cue a playing at the begin video frame of the non-sequential video segment; (iv) utilizing the first navigator to enable a playing of the first video segment; and (v) synchronizing the second navigator to enable a playing of the non-sequential video segment seamlessly following the playing of the first video segment.

In one illustrative embodiment of the inventive methods and steps disclosed herein, a method of playing a video, the method comprises the steps of: (i) initializing playback of a video; (ii) obtaining an identifier of the video; (iii) downloading, responsive to the identifier and from a remote source, (a) segment information defining a begin video frame and an end video frame of each of a plurality of video segments within the video, the segment information enabling, responsive to a user's content preferences, of a playing of a presentation of the video less in length than the length of the video, the presentation seamlessly skipping a playing of a video segment within the video, (b) seek/step data identifying, for each of a plurality of video frames within the video, a navigation point and a number of video frames that are required to step to a video frame, and (c) bookmark generating data; (iv) generating, responsive to the bookmark generating data, a bookmark for the video to be utilized by a navigator to enable a user to avoid to manually navigate past a menu and a trailer provided with the video; (v) utilizing the seek/step data and a first navigator to seek to a navigation point appropriate to a begin video frame of a first video segment, to step to the begin video frame of the first video segment, and to cue a playing at the begin video frame of the first video segment; (vi) utilizing the seek/step data and a second navigator to seek to a navigation point appropriate to a begin video frame of a non-sequential video segment, step to the begin video frame of the non-sequential video segment, and cue a playing at the begin video frame of the non-sequential video segment; (vii) utilizing the first navigator to enable a playing of the first video segment; and (viii) synchronizing the second navigator to enable a playing of the non-sequential video segment seamlessly following the playing of the first video segment. These examples suggest other possible embodiments resulting from the possible combinations, addition, deletion, and substitutions of the steps and/or elements.

Specifically, in the illustrative embodiments, and in general herein, the terms "first" and "second" are utilized to differentiate one element from another element, and not to indicate position or order. In other words, a "first video segment" is not necessarily the first video segment in a movie. A "first video segment" may be a non-sequential video segment that begins at, for example, 25 minutes into the movie. In the above illustrative embodiment, the "first video segment" may in fact be the last segment in the movie and the non-sequential video segment would be a video segment "grafted" from an earlier place in the movie. Similarly, the terms "first navigator" and "second navigator" are utilized to differentiate different instances of the same navigator. Of course, a "first navigator" and "second navigator" could be different navigators having different capabilities. For example, one navigator could be used just to seek to I-frames. Further, in a videobase embodiment (e.g., multiple DVD-Videos stored in a carousel, or multiple videos stored in a solid-state drive), multiple navigators may be advantageously utilized to facilitate the seamless playback of video segments retrieved from within a plurality of videos.

For the sake of simplicity, the flow chart of FIG. 6 does not explicitly address the additional steps that may be required to accommodate DVD-Videos, and the like, that include multiple versions of a video. For example, a DVD-Video for the motion picture "Ted" offers the theatrical released version (Title 1 with a length of 1 hour and 46 minutes) and an unrated version (Title 2 with a length of 1 hour and 52 minutes). Although not required, a single map or multiple maps may provide the information for each of the versions. In those instances, the necessary navigation data is retrieved from the video and/or the map and the user is provided the option to indicate a version preference for one or the other version and in some instances both versions (e.g., keyword Search feature). In the case of Ted, since the unrated version provides more explicit content than the theatrical release, and given the content customization capabilities of the Control feature, the map only addresses the unrated version. In those instances in which a variable content video provides materially alternative content, then a single map or multiple maps would advantageously provide the information for each of the versions, and the user would be presented the version options to indicate a version preference.

In one embodiment, a map comprises: (i) bookmark generating data that enable a user to avoid to manually navigate a menu and a trailer provided with a movie, the bookmark generating data identifies a menu selection that is required to advance towards a playing of the movie; (ii) seek/step data identifying, for each of a plurality of video frames within the movie, a navigation point and a number of video frames that are required to step to a video frame, the seek/step data enabling a navigator to seek to a navigation point appropriate to a begin video frame of a video segment, to step to the begin video frame of the video segment, and to begin playing at the begin video frame of the video segment; and (iii) segment information defining a begin video frame and an end video frame of each of a plurality of video segments within the movie, the segment information enabling, responsive to a user's content preferences, playing a presentation of the movie less in length than the length of the movie, the presentation seamlessly skipping a playing of a video segment within the movie.

In one alternate embodiment, the movie, the menu, and the trailer are stored in a DVD-Video, and the navigator is a Microsoft DVD Navigator, decoder filters, and renderer. In an alternate embodiment, the movie, the menu, the trailer, and the map are downloaded from a remote source and stored in, for example, a hard disk drive, solid-state drive, a writable optical disc storage medium, or any type of data storage. The downloading may be from the same remote source or from related or unrelated sources or sites. In such an embodiment, a method may further comprise, for example, the steps of: (i) downloading a video comprising navigation data, at least one menu, at least one trailer, and a movie; (ii) initializing playback of a video; (iii) obtaining an identifier of the video; (iv) downloading, responsive to the identifier and from a remote source, (a) segment information defining a begin video frame and an end video frame of each of a plurality of video segments within the movie, and (b) bookmark generating data that identifies a menu selection that is required to advance towards a playing of the movie; (v) generating, responsive to the bookmark generating data, a bookmark for the movie to be utilized by a navigator, the generating enabling a user to avoid to manually navigate past a menu and a trailer provided with the video; (vi) retrieving content preferences of the user; and (vii) playing, responsive to the user's content preferences and the bookmark, a presentation of the movie less in length than the length of the movie, the presentation seamlessly skipping a playing of a video segment within the movie.

In one embodiment relating to playing a presentation, the method comprises the steps of: (i) initializing playback of a video, the video comprising navigation data, at least one menu, at least one trailer, and a movie; (ii) obtaining an identifier of the video; (iii) downloading, responsive to the identifier and from a remote source, (a) segment information defining a begin video frame and an end video frame of each of a plurality of video segments within the movie, (b) seek/step data identifying, for each of a plurality of video frames within the movie, a navigation point and a number of video frames that are required to step to a video frame, and (c) bookmark generating data that identifies a menu selection that is required to advance towards a playing of the movie; (iv) generating, responsive to the bookmark generating data, a bookmark for the movie to be utilized by a navigator, the generating enabling a user to avoid to manually navigate past a menu and a trailer provided with the video; (v) retrieving content preferences of the user; (vi) applying the content preferences to the segment information to identify a first video segment and a non-sequential video segment; (vii) utilizing the seek/step data and a first navigator to seek to a navigation point appropriate to a begin video frame of the first video segment, to step to the begin video frame of the first video segment, and to cue a playing at the begin video frame of the first video segment; (viii) utilizing the seek/step data and a second navigator to seek to a navigation point appropriate to a begin video frame of the non-sequential video segment, step to the begin video frame of the non-sequential video segment, and cue a playing at the begin video frame of the non-sequential video segment; (ix) utilizing the first navigator to enable a playing of the first video segment; and (x) synchronizing the second navigator to enable a playing of the non-sequential video segment seamlessly following the playing of the first video segment.

Clearly, the various embodiments that are detailed demonstrate that the inventions are not limited to any particular embodiment, many combinations of the various elements are possible to fit each of a multitude of situations.

Multimedia Player

Preferred embodiments of the various inventive elements disclosed herein utilize a player comprising synergistically integrated random access and communications capabilities. The player comprises the various functions, capabilities and components of a variety of consumer electronic systems including, for example, an optical player and a gaming system, e.g., Sony PlayStation 3; a video recorder, e.g., 300-hr TiVo® Series3™ HD Digital Media Recorder; a set-top box capable of retrieving video-on-demand services from a remote video services provider, e.g., a Scientific Atlanta Explorer 8000; a multimedia computing device, e.g., a desktop computer with, for example, a 16×DVD drive; and a full-featured editing system, e.g., Avid Xpress Pro. The teachings of such devices are incorporated herein by reference.

A player permits a user to obtain videos, multimedia, and other services from storage means within the player, sources locally accessible, and/or from a remote services provider. Additionally, the player, as per the various inventions detailed herein, comprises the means and operational methods of, for example, (i) customizing a playing of a motion picture stored in an optical readable disc; (ii) time shifting and customizing the playing of a motion picture obtained from, for example, a DBS transmission; (iii) integrating communications (e.g. phone answering) with a playing (e.g. auto-replay) of a motion picture; and (iv) auto-configuring a host player.

Figure 7:
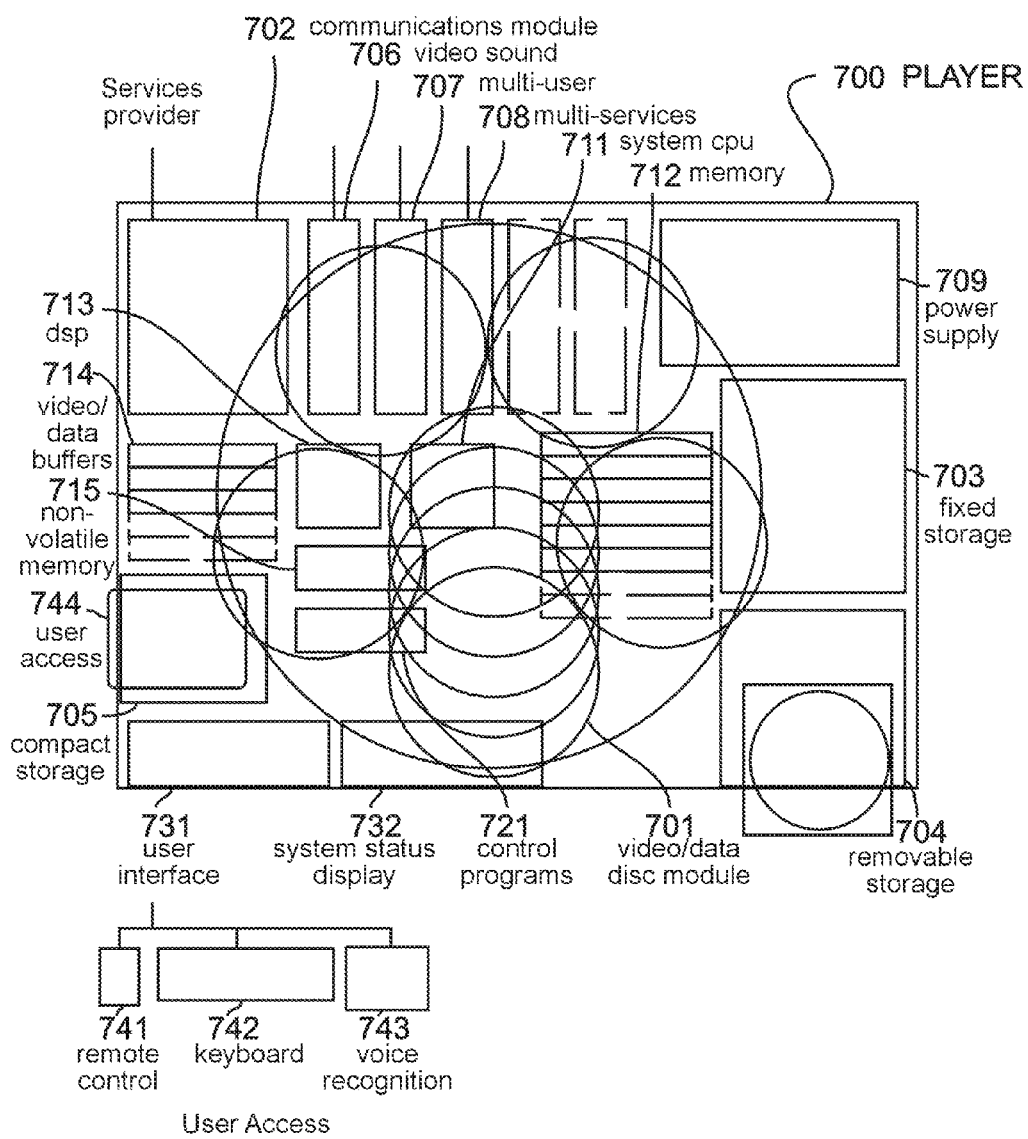
FIG. 7 is a schematic diagram of a multisource receiver transmitter player.

FIG. 7 is a schematic diagram of a multi-featured player 700 comprising the following primary modules and subsystems: i) random access video/data disc module (e.g. a multi-disc optical read/write drive) 701; ii) communications module 702; iii) fixed storage subsystem 703; iv) removable storage subsystem 704; v) compact portable storage subsystem 705; vi) external video/audio input/output support module 706; vii) multi-user modules 707; and viii) multi-services modules 708.

The communications module 702 may be as simple as a modem card or device, or as sophisticated as may be required by a direct fiber optic access to a remote video and communication services provider. The communications module may support a plurality and variety of wired and wireless connections to access a variety of networks. Additionally, the communications module may support a plurality of competing broadcasts and on-demand video delivery systems. In this fashion by merely depressing the appropriate keys in a remote control device a user can easily switch between off the air transmissions and on-line services. By this method a video services provider can satisfy a wide range of video requirements without necessarily utilizing video-on-demand system capacity. In such instances a player may be connected to a local receiving means. The receiving means may be, for example, an indoor antenna, an outdoor antenna, an existing system, such as the electrical system, that may serve as an antenna, or a local media server.

The fixed memory subsystem 703 refers to any nonvolatile memory storage device principally utilized to randomly read/write and store significant quantities of information. An example of a fixed memory storage subsystem is a personal computer's hard disk drive (HDD) and a solid-state drive (SDD).

The removable memory subsystem 704 refers to any nonvolatile memory storage device principally utilized to transport information to and from two similarly equipped devices. Examples of removable memory storage subsystems are electronic memories and removable hard disks. Electronic memories comprise, for example, USB flash drives. The random access disc module 701 is another example of a removable storage subsystem.

The compact portable storage subsystem 705 and user access media 744 is principally distinguished from a removable storage subsystem 704 by the size of the media and the greater variety of memory storage technologies that are generally implemented. Nonetheless, some of the removable storage media, such as for example a flash drive, are also considered user access media 744. Examples of other removable storage media and user access media are: laser read/write cards, in which at least one surface of the card permits a laser to read/write information; electronic cards, in which the information is stored in electronic components; magnetic cards and drives embodying magnetic storage technology, electronic memories and cartridges.

Clearly, a variety of memory devices are available utilizing technologies and combinations of technologies to suit particular performance requirements. The above classifications of the memory devices are directed at bringing attention to functional capabilities of a player rather than to a particular technology. The classifications are not intended to restrict a subsystem to a particular classification, limit the selection of subsystems which may be implemented, or to limit the function of the particular subsystem implemented.

It is intended that a full featured player additionally "play" a variety of laser readable media, such as, Blu-rays, DVDs, CDs, photo CDs, and interactive videos and games, in a conventional manner. The wide range of video/data discs that may be accommodated and the various configurations are diagrammatically emphasized in FIG. 7 as the five stacked circles and the five circles inside the representation of the video/data disc unit 701.

The external video/audio input/output support module 706 supports video/audio/data transmission to the primary video display system comprising, for example, a monitor/television, stereo system, and keyboard/voice recognition-response. Additionally, the input/output module supports video/audio input from local sources such as for example video cameras, and videophones. The construction of the external support module follows the conventional practices of consumer electronic products as for example: optical disc players, recorders, and personal computers.

Multi-user modules 707 principally support separate controlled independent access by other users of the player's processing, video, and communications resources. The construction of multi-user modules following established networking technologies.

In a preferred embodiment, instead of utilizing one of the Windows operating systems, the player will incorporate a small footprint multi-user multitasking real-time operating system with a streamlined user interface patterned after, for example, the simpler interface of a cable receiver. A multilayer approach to the functionality/complexity of such functions as surfing the net; contact management and email, optical disc/internet hybrid games, applications and services; video editing; multimedia and word processing; and portfolio management and banking, are made available at a streamlined level that provides functionality required by most users at a markedly reduced level of complexity.

Multi-services modules 708 provide a host of services, such as for example residential security, and appliance operation management. The operation of the module being principally a software application running under the multi-user operating system implemented. The construction of the particular multi-service module is responsive to the particular application.

The player further comprises computing elements and video processing elements readily found in multimedia devices and video electronic systems such as, for example, and not limitation, microprocessor 711, memory units 712, video processor or digital signal processor 713, video, audio, and data buffers 714, and nonvolatile memory 715. The video audio module or board 706 and the video processor 713 comprise compression-decompression technologies to both retrieve and decompress videos and compress and transmit videos. The compression technologies may include hardware, firmware, software, or any combination of these. One or a plurality of existing and forthcoming video compression methods may be implemented such as: Motion-JPEG, MPEG 1, MPEG 2, Fractals, Wavelets, and MPEG 4.

A player's control programs that manage the player's resources, and the retrieval and processing of data and video information, reside in dedicated chips 721. Alternatively, or additionally, control programs are stored in mass memory devices 703 from installed or downloaded software, in removable memory media 704, or in a user access media 744.

A player's user control interface 731 includes communications to the buttons and keys located on the cabinet of the device, and to the associated control devices 741-742-743. The keys, buttons, and switches, conventionally found in consumer electronic systems and deemed advantageous to the operation of the player may also be implemented. These controls are further augmented by a plurality of function comprising: segment skipping control, magnification controls, content preferences control, video map control, and system menu control. The user control interface 731 additionally supports infrared and/or RF remote control units 741, e.g., numeric control pad, keyboard with a touchpad, and game controller; wire connected control units 742, e.g., cable connected computer keyboard, mouse, and game controller; a voice recognition unit 743; and touch-screen capability. A remote control 741 may also include any device, such as a smart phone or pad, that may be synergistically integrated to support functions and features disclosed and/or incorporated herein by reference.

The keyboard, similar to a personal computer implementation, facilitates system setup, keyword retrieval, and system functions requiring the entry of alpha characters. Since a preferred configuration of a player comprises significant multimedia capabilities, a keyboard pointing means is advantageous. A keyboard connector used to connect a standard AT keyboard or a dedicated keyboard is supplied. Alternatively, an infrared-based or radio-based keyboard is implemented. Further, given the computing and storage capabilities of the player, a voice response subsystem option accommodating at least the few commands, such as play, stop, mute, audio, skip, required to control the basic operations can additionally be provided. The sophistication of the voice recognition capability can be enhanced as the hardware/software configuration of the player advances within mass market price points.

Implemented in the player is a digital system status display subsystem 732, which provides visual feedback and system status information similar to the implementations in video playback devices.

In general, parts, subassemblies, and components of a player are of conventional characteristics and are freely substituted by like functioning elements and components. For example, and not limitation, while fiber optic-based communications are preferred, copper phone lines and coaxial cable-based communications are considered less capable functional equivalents. Additionally, a certain degree of redundancy of components is illustrated in FIG. 7 to schematically show and detail significant functions.

Clearly, redundant components, in general, and redundant electronic components, in particular, are intended to be eliminated in a preferred embodiment. For example, while a player may include a removable memory subsystem and a compact memory subsystem, one may be the functional equivalent of the other, and one or the other may be eliminated. In general, where cost effective, components are designed to serve a combination of functions.

Further, the configuration of the player's various modules, components, and subsystems, are intended to offer flexibility analogous to that found in a personal computer. Specifically with respect to the multi-user capabilities, a player may be configured, for example, with more than one optical module, whether inside the primary cabinet or in a mating or sister cabinet. Various embodiments of players do not include all, or even most, of the means, and/or capabilities detailed herein. The particular configuration of a player is responsive to the particular functions or features desired.

Responsive to user friendliness, a more advanced wireless plug and play communications and power motherboard and cabinet design is preferred. The motherboard and cabinet would permit the replacement of, for example, the power supply 709 just as easily as a battery is replaced in a portable personal computer. In a preferred embodiment of a player, every component and subsystem is added or replaced without resorting to screwdrivers and the need to unplug and plug communications and power cables.

Generally, in, for example, an optical disc implementation, the entire variable content video (video/audio and video map) is provided in a format similar to that required by the video images contained in the disc. Specifically, in a DVD implementation, the video map is included in a digital format and the video content is included in a digital compressed format in one or more spiral tracks. A video map may be provided with, or separate from, the video's video and audio data. For example, a DVD may comprise, as part of its manufacturing, a prerecorded video and a corresponding video map whether separate from video frames or interleaved among video frames. Clearly, the playing of a DVD is not technically limited to the manner prescribed by the widely accepted DVD specifications.

Alternatively, the video map and other data may be separately provided by a removable memory media, user access media, or downloaded by means of the communications interface. For example, a player simply configured and comprising, a DVD drive and a flash drive or modem provides editing and retrieval benefits for DVDs storing a conventional linear video. Additionally, the drive may serve to store a user's generalized or video specific video content preferences. Conventional linear video programs provide a library of motion pictures to which the teachings herein may be applied.

In those instances where the authoring of the video did not include the production of a video map, the map may be retrieved from a source, e.g., a web site, other than the source of the video, e.g. an optical drive or a remote video provider. In this embodiment, a video map, user interface and other control programs particular to the motion picture may be downloaded by the internet from a remote map server or other player. Upon a playing of a video, the control program causes the reading of the video's identifier from the video source 701, searches the mass memory fixed storage device 703 for a video map and if not available communicates with an external source to download the appropriate map.

With respect to control programs, scheduling routines, user preferences, video map, and other principally software elements, it is noted that these may be separately or jointly stored in any one of a player's various firmware/hardware memory devices. For example, the user's content preferences are stored in nonvolatile resident memory 715, in the memory of the fixed or removable memory subsystem 703/704, a user's optical read/write access card or electronic memory card 744, or from the respective read/write video/data disc 701. In an interactive video game application, data, in general, and game software, in particular, for example, may be downloaded to the hard disk, reserving subsequent access of the optical disc for video/audio retrieval. A player's processing of the control programs 721 is principally a function of the system CPU 711 and system RAM 712.

Networks

A video, segment information, play routines specific to the video, and control codes for automatically configuring or controlling the functions of the player may be provided by means of a variety of existing and evolving technologies. In addition to the hard formats such as tape, optical disc, optical/magnetic disk, memory chips and modules (e.g. RAM, DRAM, high capacity flash memory, bubble memory); a video may be provided by soft formats that may be implemented in a variety of communications networks utilizing for example analog or digital cable transmissions, fiber optic transmission, phone and satellite communications. A player need not be physically accessible by a user or be physically located near a display device or a television set. The player may provide a user access to remote video resources and may itself be remotely controlled by the user. Fiber optic and coaxial communications easily permit the required transfer rates over long distances between controllers, players, other video sources and displays.

It is within a network-based implementation, that the various advantages and capabilities of the preferred embodiments are realized with respect to the specific hardware technologies and architectures of an underlying video delivery system.

Figure 8:
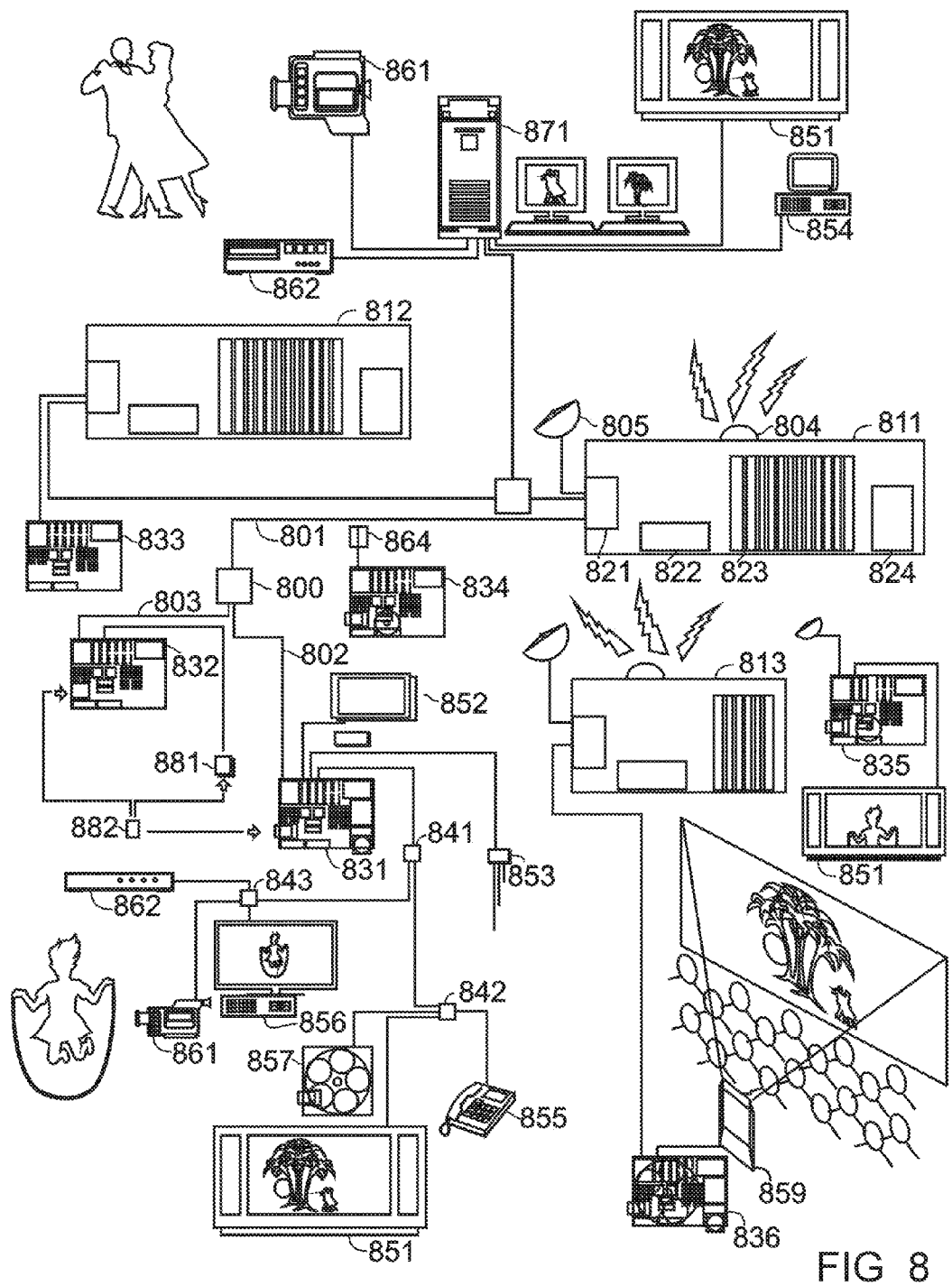
FIG. 8 is a schematic diagram of a video provider and end user network architecture.

FIG. 8 is a schematic diagram of a video provider and end user network architecture in which participants in the network 800 comprise any number of video providers 811-813, and any number of end users 831-836. Participants in the network 800, however, whether classified as video providers 811-813 or end users 831-836 are both providers and end users of video services. Analogous to a communications network, each participant is able to retrieve and transmit video/data from any other participant. An example is the "YouTube" free online video streaming service that allows users to view and share videos that have been uploaded by other users.

A video-on-demand system, in general, a content-on-demand system, the delivery of variable content video services, and the delivery of video maps in particular, are herein intended to be deployable by a variety of possible networks and player configurations. FIG. 8 suggests a plurality of network infrastructures that may be implemented. Shown are wired and non-wired video transmission infrastructures based on, for example, the use of one or a hybrid combination of the following: fiber optic 801, coaxial cable 802, twisted copper wire 803, microwave, radio WIFI, or Bluetooth 804, and satellite 805.

Each participant in the network obtains a hardware configuration consistent with their desire and objectives, and their financial resources. The video system of a participant who wishes to serve as a video provider 811-813 is functionally equivalent to the player previously detailed with respect to FIG. 7, differing only in that the respective resources are appropriately scaled and modified to simultaneously access a variety of videos, and service a number of end users. Both an end user's player 831 and a nonlinear editing system 871 are in fact video servers. A video server of a video services provider is distinguished principally by the significantly greater video storage capacity and the number of video streams it can service.

A video provider system, for example 811, comprises: i) communications technologies 821 for establishing a plurality of video and communications streams to a plurality of players 831-836 to enable the uploading and/or downloading of information, data and/or video content, such as segments and videos; ii) processing hardware and software 822 for retrieving from a player an end user's video preferences, content preferences, search terms and search requests, and for processing the user's video preferences, content preferences, search terms and search requests. e.g., performing searches of segment data to identify the segments or list of segments responsive to a users search terms and search requests; iii) mass storage random access memory devices 823 for storing and retrieving video maps (e.g., segment data), and/or a videobase comprising a plurality of any combination of video segments, motion pictures, conventional programs, interactive games and services, and variable content videos; and iv) processing hardware and software 824 for maintaining accounting and support services in connection with video services provided.

Simply stated, a variable content video provider system 811-813 comprises a video server and the video server software being enhanced to deliver variable content video services.

Video providers may be further categorized according to the functions served and/or the extent and character of the data and videobase maintained. Central video services providers 811 may be capable of providing a greater variety of video services than for example regional or local services providers 813. Regional or local services providers 813, however may be the source of local interest video services such as are currently broadcast by local television stations. Other video services providers 812 may act as "libraries" for specialized categories of videos, as for example an historical video archive of government proceedings; or services as for example electronics shopping. The internet architecture and the different classes of web sites are suggestive of the wide range of multimedia configurations that are possible.

A user's access to the resources of a video services provider 811-813 need not be direct. A requested video may be downloaded, in real time or non-real-time, to a services provider that may be more economically accessible to the intended user. Within the network, some video services provider may not directly provide any services to users, but act as centralized video originators or depositories for other services providers.

The video server's mass storage random access memory devices 823 for storing a plurality of variable content videos may advantageously implement a multiple-read/write head architecture. This would also facilitate the simultaneous retrieval of several versions of a video from a single video source to satisfy simultaneously the particular viewing requirements of several end users. A multiple-read-head architecture reduces, for example, the number of copies of a video that the on-line video server may need to store.

In this context it is also noted that the mass storage devices may additionally implement stripping methods to store a video across several storage devices. Where cost effective, a variable content video may be entirely or partially stored in RAM.

The particular configuration of a player's random access, storage, memory, processing, and communication means and capabilities are responsive to, but are not necessarily limited by, the minimum requirements of, for example, a particular service provider. A player configuration, such as detailed with respect to FIG. 7, provides the required video accessing and storage, processing, and communications architecture required by a network-based remote video services provider.

The player's multi-user and multi-services modules support separate controlled independent access by a plurality of users of the player's processing, video, and communications resources. In addition to the primary video display system 851 supported by a player 831, the multi-user module and multi-services module installed also provides services to a monitor/keyboard 852, security system 853, personal multimedia computer 856, voice and/or video/voice telephones 855. In this fashion a player acts an intermediate services provider.

The particular location of the player, subsystems, or components, whether within the immediate boundaries of a residence, automobile, or the particular location of the end user, are not limited herein to any particular arrangement. A variety of configurations are possible to meet the various needs at any particular time of the end user. In a preferred embodiment a player is similar in size and weigh to a super thin portable notebook computer. This permits a user to have available all of the functions herein detailed irrespective of the user's particular location at any moment in time.

In commercial applications, such as a theater, a player 836 may support a high definition projector 859. For illustration purposes, connections between players and output devices are shown with lines. However, communications may be established by any of a variety of wired or wireless means. Thus, a player 731 need not be directly or indirectly connected by wire to the devices 851-859, 861-862. Further, devices 851-859, 861-862 may be connected to a communications port 841-843 which is in communications with the player 831. The communications port may be of varying degrees of intelligence and capabilities, it may serve to boost or manage the signal, or have no other purpose than to serve as a convenient outlet in which to plug and unplug devices.

In an embodiment as shown in FIG. 8, a location will be "wired" or "networked" to enable a self configuring player to identify and establish a communications with other devices in the network. Additionally, player modules may themselves be physically distributed over the network. The plug and play of modules across a network architecture permits, for example, that the video disc module be physically remote from a player's 831 main unit and plugged on a port 842 near the television 851. In this instance, the case 857 housing the video disc module also houses a compact storage module. Thus, a single video disc module can be easily moved from one location 842 to another location 843 when physical proximity is required to conveniently replace discs. It is noted that while the disc module case 857 is connected to a first port 842, it would be remotely accessible to a terminal 856 plugged into a second port 843.

FIG. 8 also shows, for example, the use of a separate compact portable storage subsystem 881 and a user access media 882 to physically transport user data, video map, and/or video between players 831-832.

A player's core components may be located anywhere inside or outside the location. Specially, where a player includes fans and disk drives, the top of the TV set would not be an ideal location.

As detailed previously, the user's control of a player is either through an infrared control keypad, wired or infrared alphanumeric control keyboard, voice control, or system controls directly on the player. These controls may be directly incorporated in the devices accessing the player such as a TV.

The novel combination of an external fiber optic based communications module and a multiple read/write storage module, provides a player configuration capable of efficiently downloading significant amounts of full motion video to be viewed, played with, or processed at the end user's leisure. In such a player, the downloading of, for example, a feature length motion picture, an interactive video game, or a series of lectures can be achieved with unprecedented speed.

As suggested earlier, an object of FIG. 8 is to convey the concept that an end user's player 831-836 and an editing system 871 can both upload and download video and video maps through the network directly to other end users 831-836, editing systems 871, and/or to the video servers of videos services providers 811-813.

A player may be configured to duplicate the functions of a nonlinear editing system as previously detailed. Both the player 831 and the editing system 871 are capable of receiving input from other sources such as a digital video camera 861 and digital video recorder 862 (e.g., TiVo Premiere XL4 DVR). As is the case with player 831, the editing system 871 is capable of outputting video to, for example, a TV 851 and to a PC 854.

As indicated previously, a player can accommodate a plurality of compression and decompression technologies to both retrieve and decompress videos and compress and transmit videos through the network. Preferably, a specific video originating at a digital camera 861, downloaded to a nonlinear editing system 871, transmitted over the network 800 to a video server for retransmission over the network 800 to a player 831 will utilize a single compression technology to avoid compounding the effects of artifacts that may be introduced by a particular compression technology. Clearly, where the decompression technology resides completely in software, the video itself could provide the required decompression software.

As indicated above, variable content video services can be delivered by means of any of a number of non-wired based video delivery systems. For example, microwave technologies may provide two way video services including movies-on-demand. The network uses a series of transmitters 804, each of which is capable of broadcasting a digital signal. End users utilize an antenna 864 to receive the signal. The antenna 864 is connected to a decoder connected to a TV set. In an embodiment, a player 834 performs the processing and decoding functions required for transmission to a video display.

In a preferred embodiment of a cellular-like system, a video provider's cell site 813 comprises microwave communications, video server, and processing systems for establishing a plurality of video and communications streams to a plurality of players 831-836.

Video Provider

A player's capability to download videos from a remote video provider permits an end user to efficiently obtain, from an extensive videobase, a video(s), segment(s) of a video, and/or segment(s) from each of a plurality of videos, to be viewed at the time of the user's choosing, over which the user exercises complete control as to the subject matter, form of expression, and other elements comprising the video. Further, the resulting video need not comprise or result from a single videobase. A video may result from the automated selection of a variety of segments/videos from one or a plurality of videobases.

Figure 9:
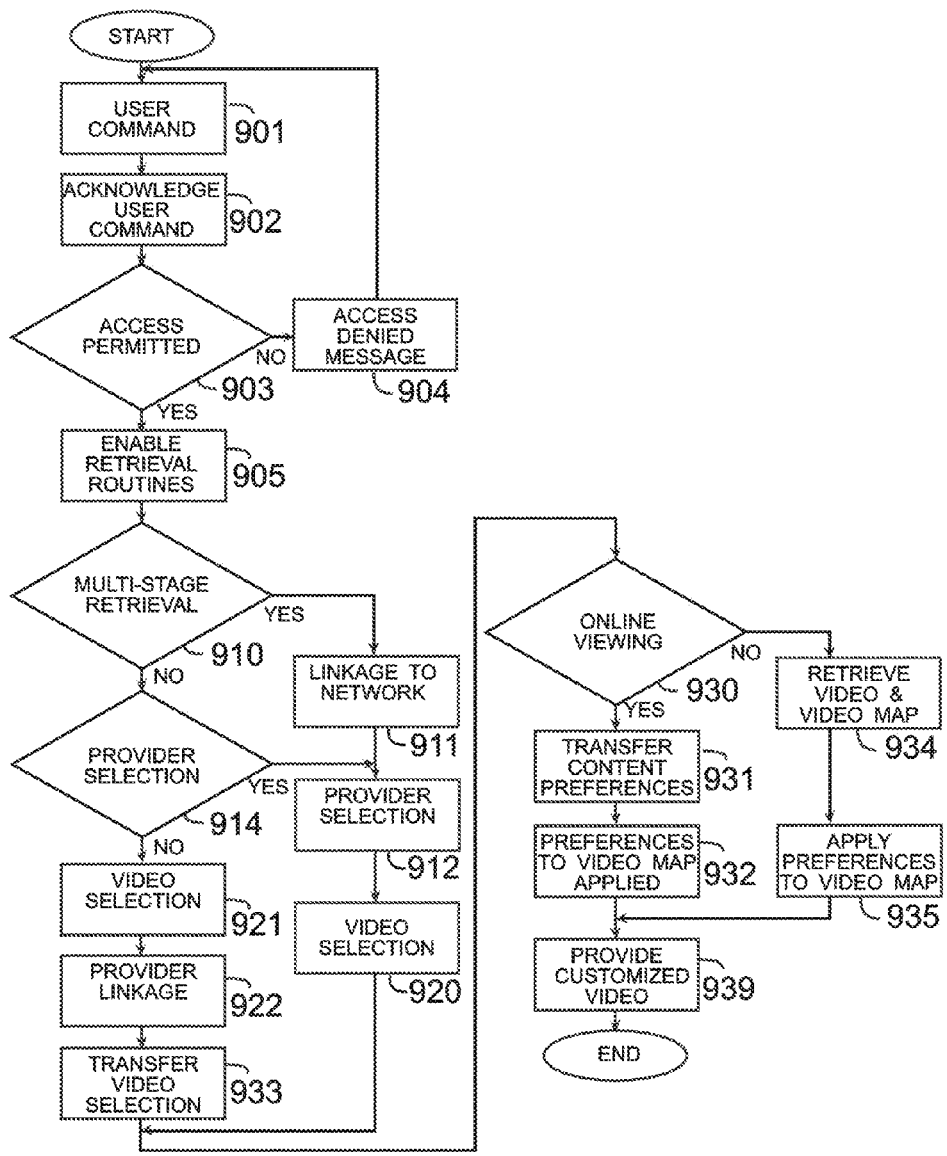
FIG. 9 is a flow chart of a method of variably playing a video obtained from a remote video provider.

FIG. 9 is a flow chart detailing a method of variably playing a video obtained from a remote video provider. It is noted that handshaking and other routines are flexible and user configurable and a number of permutations and variations of what is detailed are possible. In operation, a player normally provides a variety of communication and background services and is, therefore, ready to respond to an user command 901. Upon receipt of a user command, the player provides power to a display unit (TV) if necessary, and transmits an appropriate acknowledgment 902. Access routines are enabled to determine if a user's access is permitted 903. In a preferred embodiment, these routines reside within the player and are executed prior to establishing a communications linkage with either a network administrator or directly with a video services provider. If access is denied 903, an error message 904 is provided to the display and the player is returned to the state prior to the user active request. Delay routines may be implemented to provide the user the opportunity to attempt to obtain access without a player going to "sleep".

If access is permitted 903, retrieval routines are enabled 905 to permit the remote retrieval of a video. It is noted that in the case of the video dial-tone model, there may be a multi-stage retrieval routine 910 when the user first establishes communications with the network administrator 911, for example a cable or telephone company, then selects a particular video services provider 912, and then request the desired video 920. Alternatively, retrieval routines 914 permit a direct selection of a video services provider 912. Video selection 920 then proceeds on-line with the selected video provider. A video services provider can be pre-established. In that case, the user would skip having to select a services provider immediately prior to a video request. Further, a user may establish relationships with specific video providers for specified services. Still further, the video selection process 921 may determine with which provider a communications linkage is automatically established 922. The result of the video selection process is automatically transferred 923 to the appropriate provider upon the establishment of a communications linkage. Clearly, the selection of a video services provider is not required in those instances where a user obtains all the services from a single provider. It is noted that other combinations are possible and that retrieval routines may reside within a player to further minimize the on-line time, or be provided on-line at different points in the communications than shown here. The video selection process may implement any one or more routines that are suggested by the examples herein provided.

Once a video is selected, if the user remains on-line during the viewing of the video 930, the user's content preferences are communicated to the video provider 931. The video provider server then applies the user's preferences to the map of the selected video 932 and provides the resulting seamless and continuous presentation of the video that is consistent with the user's preferences 939. In this case the user remains on-line during the viewing of the presentation 939, but has access to video viewing control functions as if the video was directly available to the player.

Alternatively, the entire video, including all the parallel, overlapping, and transitional segments of multiple versions, the video map, and seek/step data if necessary, are retrieved from the video provider 934. Once downloaded, the player applies the user's preferences to the map of the selected video 935 and provides a presentation of the video that is consistent with the user's preferences 939. In this case the user has direct access to the player's video viewing control functions. Whether only the resulting presentation(s) of the video is downloaded, or the entire video, including the video map and seek/step data if necessary, the user may interact with the video to the degree that the user desires. If player is off-line and the interaction requires additional video from the video services provider, the player automatically reestablishes communications with the appropriate video services provider and brings the video server up to speed. That is, the player automatically provides the required information to enable the video server to comply with the user's requirements.

In those instances where multiple versions of a video, the video map, and seek/step data if necessary, is downloaded, the player need not store all of the segments, and if all of the segments are stored, they need not all be stored for more than a transitory period, i.e., the time for a user to erase the undesired content. A video map provides the information to omit the initial storage or to erase, the storage of content of the video. This would be of particular benefit for, for example, a parent downloading an "R" motion picture, and after viewing it, causing the erasure of those segments which are inconsistent with a "PG" version. Or for example, a user causing, for example, only a Romance version, or the results of keyword searches to be saved. A significant advantage of the partial erasure of content is that storage capacity is freed for a subsequent use. In such instances, the original video maps may be retained; or only the relevant data of the video map may be retained separately and/or incorporated within a master video map. Similarly, the seek/step data may be synchronized to the remaining content by deletion, adjustment, and/or cross-reference.

The teachings disclosed herein, directly and indirectly by, for example, incorporation, are intended to show a variety of architectures, services, capabilities, systems, methods, and inventive elements which are combined and may be combined to suit particular embodiments. The synergies among and between the various inventive elements is a significant feature of the disclosures herein. The various examples included herein demonstrate that it is intended, and deemed advantageous, that each of the methods detailed herein benefit from the teachings presented with other methods detailed herein and/or incorporated by reference. Further, it is the intent of incorporation to derive the full benefits, as an addition or an alternative, of the logical integration of the teachings herein with the teachings of the references cited. The incorporation by reference at a specific place within the specification is not intended to limit the extent to which the reference is incorporated, or the manner in which it may be integrated. Where a teaching may be deemed to be at cross purposes, or otherwise incompatible, with some other teaching, it ought to be understood as a possible alternative to be utilized as a particular preferred embodiment may require. Clearly, it may be neither advantageous nor practical for all the elements or a particular combination of elements to be implemented in a single embodiment.

While elements of the inventions have been detailed in conjunction with specific embodiments thereof, it is evident that many alternatives, modifications and variations are possible and will be apparent to those skilled in the art in light of the foregoing description. For example, while the detailed disclosure references DVD-Videos and a DVD Navigator; the inventions are not limited to an optical disc format or any other type of video format, or to the specific capabilities of a navigator. Accordingly, it is intended to embrace all such alternatives, modifications, variations, and combinations as fall within the spirit and broad scope of the specification. The teachings that have been cited and incorporated herein are offered by way of example, and not limitation, of the underlying foundation of knowledge and skill that is available. Many of the features, components, and methods found in the art may be incorporated, as suggested herein, in a preferred embodiment; and since other modifications and changes varied to fit particular requirements and environments will be apparent to those skilled in the art, the inventions are not limited to the embodiments set forth or suggested herein. It is to be understood that the inventions are not limited thereby. It is also to be understood that the specific details shown are merely illustrative, and that the inventions may be carried out in other ways without departing from the broad spirit and scope of the specification.

What is claimed is:

1. A method comprising the steps of:
retrieving (i) bookmark generating data, (ii) seek/step data identifying, for each of a plurality of video frames within a movie, a navigation point and a number of video frames that are required to step to a video frame, and (iii) segment information defining a begin video frame and an end video frame of each of a plurality of video segments within the movie;
generating, responsive to the bookmark generating data, a bookmark to be utilized by a navigator to navigate past a menu;
utilizing a first navigator to seek to a navigation point appropriate to a begin video frame of a first video segment, to step to the begin video frame of the first video segment, and to cue a playing of the first video segment;
utilizing a second navigator to seek to a navigation point appropriate to a begin video frame of a non-sequential video segment, step to the begin video frame of the non-sequential video segment, and cue a playing of the non-sequential video segment;
utilizing the first navigator to play the first video segment; and
synchronizing the second navigator to play the non-sequential video segment seamlessly following a playing of the first video segment.

2. The method of claim 1, wherein the generating of the bookmark is further responsive to a video's user operation control.

3. A method comprising the steps of:
retrieving (i) bookmark generating data, and (ii) segment information defining a begin video frame and an end video frame of each of a plurality of video segments within the movie;
generating, responsive to the bookmark generating data, a bookmark to be utilized to navigate past a menu;
utilizing a first navigator to play a first video segment; and
synchronizing a second navigator to play a non-sequential video segment seamlessly following a playing of the first video segment.

4. The method of claim 3, wherein the generating of the bookmark is further responsive to a video's user operation control.

5. A method comprising the steps of:
initializing playback of a video, the video comprising navigation data and a movie;
obtaining an identifier of the video;
retrieving, responsive to the identifier, bookmark generating data;
generating, responsive to the bookmark generating data and the navigation data, a bookmark to be utilized to navigate towards a playing of the movie;
utilizing a first navigator to play, from within the movie, a first video segment; and
synchronizing a second navigator to play, from within the movie, a non-sequential video segment seamlessly following a playing of the first video segment.

6. The method of claim 5, wherein the retrieving further comprises retrieving segment information defining a begin video frame and an end video frame of each of a plurality of video segments within the movie.

7. The method of claim 5, wherein the retrieving further comprises retrieving seek/step data identifying, for each of a plurality of video frames within the movie, a navigation point and a number of video frames that are required to step to a video frame; and wherein the method further comprises the steps of:
utilizing the seek/step data and the first navigator to seek to a navigation point appropriate to a begin video frame of the first video segment, to step to the begin video frame of the first video segment, and to cue a playing of the first video segment; and
utilizing the seek/step data and the second navigator to seek to a navigation point appropriate to a begin video frame of the non-sequential video segment, step to the begin video frame of the non-sequential video segment, and cue a playing of the non-sequential video segment.

8. The method of claim 5, wherein the retrieving further comprises retrieving segment information defining a begin video frame and an end video frame of each of a plurality of video segments within the movie; and wherein the generating of the bookmark is further responsive to a video's user operation control.

* * * * *